US010293876B2

(12) United States Patent
Dery St-Cyr et al.

(10) Patent No.: US 10,293,876 B2
(45) Date of Patent: May 21, 2019

(54) REMOVABLE BACKREST FOR A VEHICLE

(71) Applicant: BOMBARDIER RECREATIONAL PRODUCTS INC., Valcourt (CA)

(72) Inventors: Karl Dery St-Cyr, St-Denis-de-Brompton (CA); Jamal Razouki, Sherbrooke (CA); Charles Pellerin, Levis (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 71 days.

(21) Appl. No.: 15/513,668

(22) PCT Filed: Sep. 23, 2015

(86) PCT No.: PCT/IB2015/057345
§ 371 (c)(1),
(2) Date: Mar. 23, 2017

(87) PCT Pub. No.: WO2016/046774
PCT Pub. Date: Mar. 31, 2016

(65) Prior Publication Data
US 2017/0259867 A1 Sep. 14, 2017

Related U.S. Application Data

(60) Provisional application No. 62/054,059, filed on Sep. 23, 2014.

(51) Int. Cl.
*B62J 1/28* (2006.01)
*B62K 5/027* (2013.01)
(52) U.S. Cl.
CPC .............. *B62J 1/28* (2013.01); *B62K 5/027* (2013.01)

(58) Field of Classification Search
CPC .................................. B62J 1/28; B62K 5/027
USPC ..................................................... 297/440.15
See application file for complete search history.

(56) References Cited

U.S. PATENT DOCUMENTS

| 4,497,518 A | 2/1985 | Nishimura et al. |
| 5,664,715 A | 9/1997 | Gogan et al. |
| 5,667,232 A * | 9/1997 | Gogan ...................... B62J 1/28 |
| | | 280/202 |
| 5,732,965 A | 3/1998 | Willey |

(Continued)

FOREIGN PATENT DOCUMENTS

CN 2227063 Y 5/1996

OTHER PUBLICATIONS

International Search Report of PCT/IB2015/057345; dated Mar. 29, 2016; Shane Thomas.

(Continued)

*Primary Examiner* — Mark R Wendell
(74) *Attorney, Agent, or Firm* — BCF LLP

(57) ABSTRACT

A backrest for selectively connecting to a frame of a vehicle having a straddle seat has a back support, and first and second arms connected to the back support and extending forward thereof. Each of the arms has a first portion at least partially defining a first slot, a second portion slidably connected to the first portion, and a biasing member disposed between the first and second portions. The second portion defines a second slot. The first and second slots open in opposite directions. A vehicle having the backrest and a method of installing the backrest on a vehicle are also disclosed.

10 Claims, 17 Drawing Sheets

(56) References Cited

U.S. PATENT DOCUMENTS

| | | |
|---|---|---|
| 6,347,804 B1 | 2/2002 | Seibel |
| 6,443,344 B1 | 9/2002 | Nicosia et al. |
| 6,484,914 B1 * | 11/2002 | Willey .................. B62J 1/28 224/413 |
| 6,491,193 B2 | 12/2002 | Dudek et al. |
| 6,520,275 B2 | 2/2003 | Galbraith et al. |
| 6,655,740 B1 | 12/2003 | Hanagan |
| 6,729,515 B2 | 5/2004 | Nicosia et al. |
| 6,820,782 B1 | 11/2004 | Monson |
| 7,036,837 B1 | 5/2006 | Bauer et al. |
| 7,175,220 B2 * | 2/2007 | Kashiwagi ............ B62J 1/28 280/288.4 |
| 7,275,787 B1 | 10/2007 | Grove |
| 7,654,496 B2 | 2/2010 | Sharpe et al. |
| 7,661,761 B1 | 2/2010 | Ortega |
| 7,946,632 B1 * | 5/2011 | Mueller ................ B62J 1/28 280/288.4 |
| 8,146,944 B2 | 4/2012 | Miller |
| 8,162,091 B2 | 4/2012 | Laperle et al. |
| 8,172,188 B2 | 5/2012 | Dubinskiy et al. |
| 8,267,613 B2 * | 9/2012 | Lindloff ................ B62J 1/28 403/322.4 |
| 8,579,063 B2 | 11/2013 | Smith et al. |
| 8,579,169 B2 | 11/2013 | Racz et al. |
| 2005/0275268 A1 | 12/2005 | Oomori |
| 2007/0181757 A1 | 5/2007 | Sharpe et al. |

OTHER PUBLICATIONS

Supplementary European Search Report of EP15843363.1; Luis Verdelho; dated May 16, 2018; The Hague.
English abstract of CN2227063; retrieved from the Internet: <URL: http://www.worldwide.espacenet.com>.

* cited by examiner

REMOVABLE BACKREST FOR A VEHICLE

CROSS-REFERENCE

The present application claims priority to United States Provisional Patent Application No. 62/054,059, filed Sep. 23, 2014, the entirety of which is incorporated herein by reference.

FIELD OF TECHNOLOGY

The present technology relates to removable backrests for vehicles.

BACKGROUND

Many straddle-type vehicles, such as motorcycles, three-wheel on-road vehicles, and all-terrain vehicles (ATVs) for example, are provided with a straddle seat having a driver portion and a passenger portion for accommodating a driver and a passenger. In many such vehicles, the passenger seat portion is not provided with a backrest.

In order to improve passenger comfort, backrests are offered as accessories which can be installed on the vehicles. However, many such backrests once installed require the use of tools to remove the backrests and to then reinstall the backrests on the vehicles. This is inconvenient for some users of straddle-type vehicles that would like to have a backrest when a passenger is present on the vehicle, but could like to remove the backrest when no passenger is present on the vehicle.

It would therefore be desirable to have a backrest for a straddle seat of a vehicle that can be installed and removed without the use of tools.

SUMMARY

It is an object of the present technology to ameliorate at least some of the inconveniences present in the prior art.

According to one aspect of the present technology, there is provided a vehicle having a frame, a straddle seat mounted to the frame, two first posts connected to the frame on opposite sides of a longitudinal centerline of the vehicle, two second posts connected to the frame on opposite sides of the longitudinal centerline of the vehicle and being longitudinally spaced from the two first posts, and a backrest selectively connected to the frame. The backrest has a back support, a first arm connected to the back support, the first arm extending at least from the first post to the second post on a first side of the longitudinal centerline, and a second arm connected to the back support, the second arm extending at least from the first post to the second post on a second side of the longitudinal centerline. Each of the first and second arms has a first portion at least partially defining a first slot, a second portion slidably connected to the first portion, the second portion defining a second slot, the first and second slots opening in opposite directions, and a biasing member disposed between the first and second portions. The first posts is received in the first slots and abutting the first portions. The second posts is received in the second slots and abutting the second portions. The biasing members bias the first portions toward the first posts and the second portions toward the second posts.

In some implementations of the present technology, the first slot and the second slot of the first arm open away from each other, the first slot and the second slot of the second arm open away from each other, the biasing member of the first arm biases the first and second portions of the first arm away from each other, and the biasing member of the second arm biases the first and second portions of the second arm away from each other.

In some implementations of the present technology, the first slot and the second slot of the first arm open toward each other, the first slot and the second slot of the second arm open toward each other, the biasing member of the first arm biases the first and second portions of the first arm toward each other, and the biasing member of the second arm biases the first and second portions of the second arm toward each other.

In some implementations of the present technology, the backrest also has a first leg connecting the first arm to the back support, and a second leg connecting the second arm to the back support.

In some implementations of the present technology, a first strap is connected to the first arm, a second strap is connected to the second arm, a first hook is connected to the frame and engages the first strap, and a second hook is connected to the frame and engages the second strap.

In some implementations of the present technology, the first posts are disposed forward of the second posts. The back support is rigidly connected to the second portions.

In some implementations of the present technology, for each of the first and second arms, the first and the second portions define a housing and the biasing member is housed in the housing.

According to another aspect of the present technology, there is provided a backrest for selectively connecting to a frame of a vehicle having a straddle seat. The backrest has a back support, a first arm connected to the back support, the first arm extending forward of the back support on a first side of a longitudinal centerline of the backrest, and a second arm connected to the back support, the second arm extending forward of the back support on a second side of the longitudinal centerline. Each of the first and second arms has a first portion at least partially defining a first slot, a second portion slidably connected to the first portion, the second portion defining a second slot, the first and second slots opening in opposite directions, and a biasing member disposed between the first and second portions.

In some implementations of the present technology, the first slot and the second slot of the first arm open away from each other, the first slot and the second slot of the second arm open away from each other, the biasing member of the first arm biases the first and second portions of the first arm away from each other, and the biasing member of the second arm biases the first and second portions of the second arm away from each other.

In some implementations of the present technology, the first slot and the second slot of the first arm open toward each other, the first slot and the second slot of the second arm open toward each other, the biasing member of the first arm biases the first and second portions of the first arm toward each other, and the biasing member of the second arm biases the first and second portions of the second arm toward each other.

In some implementations of the present technology, a first leg connects the first arm to the back support, and a second leg connects the second arm to the back support.

In some implementations of the present technology, a first strap is connected to the first arm, and a second strap is connected to the second arm.

In some implementations of the present technology, the first portions are disposed forward of the second portions. The back support is rigidly connected to the second portions.

In some implementations of the present technology, for each of the first and second arms, the first and the second portions define a housing and the biasing member is housed in the housing.

According to another aspect of the present technology, there is provided a vehicle having a frame, a straddle seat mounted to the frame, two first brackets connected to the frame on opposite sides of a longitudinal centerline of the vehicle, each first bracket defining a first slot, two second brackets connected to the frame on opposite sides of the longitudinal centerline of the vehicle and being longitudinally spaced from the two first brackets, each second bracket defining a second slot, the first and second slots opening in opposite directions, and a backrest selectively connected to the frame. The backrest has a back support, a first arm connected to the back support, the first arm extending at least from the first bracket to the second bracket on a first side of the longitudinal centerline, and a second arm connected to the back support, the second arm extending at least from the first bracket to the second bracket on a second side of the longitudinal centerline. Each of the first and second arms has a first portion, a first post connected to the first portion, a second portion slidably connected to the first portion, a second post connected to the second portion, and a biasing member disposed between the first and second portions. The first posts are received in the first slots and abut the first brackets. The second posts are received in the second slots and abut the second brackets. The biasing members bias the first portions toward the first brackets and the second portions toward the second brackets.

In some implementations of the present technology, the first slot and the second slot on the first side of the longitudinal centerline open away from each other, the first slot and the second slot on the second side of the longitudinal centerline open away from each other, the biasing member of the first arm biases the first and second portions of the first arm toward each other, and the biasing member of the second arm biases the first and second portions of the second arm toward each other.

In some implementations of the present technology, the first slot and the second slot on the first side of the longitudinal centerline open toward each other, the first slot and the second slot on the second side of the longitudinal centerline open toward each other, the biasing member of the first arm biases the first and second portions of the first arm away from each other, and the biasing member of the second arm biases the first and second portions of the second arm away from each other.

In some implementations of the present technology, the backrest also has a first leg connecting the first arm to the back support, and a second leg connecting the second arm to the back support.

In some implementations of the present technology, a first strap is connected to the first arm, a second strap is connected to the second arm, a first hook is connected to the frame and engages the first strap, and a second hook is connected to the frame and engages the second strap.

In some implementations of the present technology, the first posts are disposed forward of the second posts. The back support is rigidly connected to the second portions.

In some implementations of the present technology, for each of the first and second arms, the first and the second portions define a housing and the biasing member is housed in the housing.

According to another aspect of the present technology, there is provided a backrest for selectively connecting to a frame of a vehicle having a straddle seat. The backrest has a back support, a first arm connected to the back support, the first arm extending forward of the back support on a first side of a longitudinal centerline of the backrest, and a second arm connected to the back support, the second arm extending forward of the back support on a second side of the longitudinal centerline. Each of the first and second arms has a first portion, a first post connected to the first portion, a second portion slidably connected to the first portion, a second post connected to the second portion, and a biasing member disposed between the first and second portions.

In some implementations of the present technology, the biasing member of the first arm biases the first and second portions of the first arm toward each other, and the biasing member of the second arm biases the first and second portions of the second arm toward each other.

In some implementations of the present technology, the biasing member of the first arm biases the first and second portions of the first arm away from each other, and the biasing member of the second arm biases the first and second portions of the second arm away from each other.

In some implementations of the present technology, a first leg connects the first arm to the back support, and a second leg connects the second arm to the back support.

In some implementations of the present technology, a first strap is connected to the first arm, and a second strap is connected to the second arm.

In some implementations of the present technology, the first portions are disposed forward of the second portions. The back support is rigidly connected to the second portions.

In some implementations of the present technology, for each of the first and second arms, the first and the second portions define a housing and the biasing member is housed in the housing.

According to another aspect of the present technology, there is provided a vehicle having a frame, a straddle seat mounted to the frame, two first posts connected to the frame on opposite sides of a longitudinal centerline of the vehicle, two brackets connected to the frame on opposite sides of the longitudinal centerline of the vehicle and being longitudinally spaced from the two first posts, each bracket defining a second slot, and a backrest selectively connected to the frame. The backrest has a back support, a first arm connected to the back support, the first arm extending at least from the first post to the bracket on a first side of the longitudinal centerline, and a second arm connected to the back support, the second arm extending at least from the first post to the bracket on a second side of the longitudinal centerline. Each of the first and second arms has a first portion, the first portion defining a first slot, a second portion slidably connected to the first portion, a second post connected to the second portion, and a biasing member disposed between the first and second portions. The first slots and the second slots open in a same direction. The first posts are received in the first slots and abut the first portions. The second posts are received in the second slots and abut the brackets. The biasing members bias the first portions toward the first posts and the second portions toward the brackets.

In some implementations of the present technology, the first slots open away from the second posts, the biasing member of the first arm biases the first and second portions of the first arm away from each other, and the biasing member of the second arm biases the first and second portions of the second arm away from each other.

In some implementations of the present technology, the backrest also has a first leg connecting the first arm to the back support, and a second leg connecting the second arm to the back support.

In some implementations of the present technology, a first strap is connected to the first arm, a second strap is connected to the second arm, a first hook is connected to the frame and engages the first strap, and a second hook is connected to the frame and engages the second strap.

In some implementations of the present technology, the first posts are disposed forward of the second posts. The back support is rigidly connected to the second portions.

In some implementations of the present technology, for each of the first and second arms, the first and the second portions define a housing and the biasing member is housed in the housing.

According to another aspect of the present technology, there is provided a backrest for selectively connecting to a frame of a vehicle having a straddle seat. The backrest has a back support, a first arm connected to the back support, the first arm extending forward of the back support on a first side of a longitudinal centerline of the backrest, and a second arm connected to the back support, the second arm extending forward of the back support on a second side of the longitudinal centerline. Each of the first and second arms has a first portion, the first portion defining a first slot, a second portion slidably connected to the first portion, a second post connected to the second portion, and a biasing member disposed between the first and second portions.

In some implementations of the present technology, the first slots open away from the second posts, the biasing member of the first arm biases the first and second portions of the first arm away from each other, and the biasing member of the second arm biases the first and second portions of the second arm away from each other.

In some implementations of the present technology, a first leg connects the first arm to the back support, and a second leg connecting the second arm to the back support.

In some implementations of the present technology, a first strap is connected to the first arm, and a second strap is connected to the second arm.

In some implementations of the present technology, the first portions are disposed forward of the second portions. The back support is rigidly connected to the second portions.

In some implementations of the present technology, for each of the first and second arms, the first and the second portions define a housing and the biasing member is housed in the housing.

According to another aspect of the present technology, there is provided a vehicle having a frame and a straddle seat mounted to the frame. The vehicle also has one of: two first posts connected to two first brackets, the two first brackets being slidably connected to the frame on opposite sides of a longitudinal centerline of the vehicle; and two first slots defined by two first brackets, the two first brackets being slidably connected to the frame on opposite sides of the longitudinal centerline of the vehicle. The vehicle also has one of: two second posts disposed on opposite sides of the longitudinal centerline of the vehicle, the two second posts being connected to one of the frame and two second brackets connected to the frame; and two second slots disposed on opposite sides of the longitudinal centerline of the vehicle, the two second slots being defined by one of the frame and two second brackets connected to the frame. Two biasing members are disposed between the two first brackets and the one of the frame and the two second brackets. A backrest is selectively connected to the frame. The backrest has a back support, a first arm connected to the back support, and a second arm connected to the back support. The first arm extends at least from the one of the first post and the first slot to the one of the second post to the second slot on a first side of the longitudinal centerline. The second arm extends at least from the one of the first post and the first slot to the one of the second post and the second slot on a second side of the longitudinal centerline. Each of the first and second arms has another one of the first post and the first slot, and another one of the second post and the second slot. The biasing members bias the first brackets such that the first posts are received in and biased into the first slots and the second posts are received in and biased into the second slots.

In some implementations of the present technology, the vehicle has the two first slots defined by the two first brackets, and the two second slots defined by the one of the frame and the two second brackets connected to the frame. Each of the first and second arms has the first post and the second posts. The first slots open away from the second slots. The biasing members bias the two first brackets against the first posts and away from the second posts.

In some implementations of the present technology, the vehicle has the two first posts connected to the two first brackets, and the two second posts connected to the one of the frame and the two second brackets connected to the frame. Each of the first and second arms defines the first slot and the second slot. The first slots open away from the second slots. The biasing members bias the two first posts toward the second posts.

In some implementations of the present technology, the backrest also has a first leg connecting the first arm to the back support, and a second leg connecting the second arm to the back support.

In some implementations of the present technology, a first strap is connected to the first arm, a second strap is connected to the second arm; a first hook is connected to the frame and engages the first strap, and a second hook is connected to the frame and engages the second strap.

According to another aspect of the present technology, there is provided a vehicle having a frame, a straddle seat mounted to the frame, two first elements on opposite sides of a longitudinal centerline of the vehicle, two second elements on opposite sides of the longitudinal centerline of the vehicle and being longitudinally spaced from the two first elements, and a backrest selectively connected to the frame. The backrest has a back support, a first arm connected to the back support, and a second arm connected to the back support. The first arm extends at least from the first element to the second element on a first side of the longitudinal centerline. The second arm extends at least from the first element to the second element on a second side of the longitudinal centerline. Each of the first and second arms has a third element and a fourth element longitudinally spaced from the third element. Two biasing members bias one of: the first element relative to the second element; and the third element relative to the fourth element. The first element is one of a first post and a first slot. The second element is one of a second post and a second slot. The third element is another one of the first post and the first slot. The fourth element is another one of the second post and the second slot. The first posts are received in the first slots. The second posts are received in the second slots. The biasing members bias the first posts into the first slots and the second posts into the second slots.

According to another aspect of the present technology, there is provided a method for installing a backrest on a vehicle. The vehicle has a frame; a straddle seat mounted to the frame; one of: two first posts connected to the frame on opposite sides of a longitudinal centerline of the vehicle, and two first brackets connected to the frame on opposite sides of the longitudinal centerline, each of the two first brackets defining a first slot; and one of: two second posts connected to the frame on opposite sides of the longitudinal centerline, and two second brackets connected to the frame on opposite sides of the longitudinal centerline, each of the two second brackets defining a second slot. The backrest has a back support; a first arm connected to the back support; and a second arm connected to the back support. Each of the first and second arms has a first portion, the first portion at least partially defining the first slot when the vehicle has the first post, the first portion having the first post connected thereto when the vehicle has the first bracket, a second portion slidably connected to the first portion, the second portion defining the second slot when the vehicle has the second post, the second portion having the second post connected thereto when the vehicle has the second bracket, and a biasing member biasing the first portion away from the second portion. The method comprises: inserting the first posts in the first slots; pushing the first and second arms to compress the biasing members; once the biasing members are compressed: aligning the second posts with the second slots; and releasing the first and second arms such that the biasing members bias the second portions away from the first portions thereby inserting the second posts in the second slots.

In some implementations of the present technology, the first posts and the first slots are disposed forward of the second posts and the second slots.

According to another aspect of the present technology, there is provided a method for installing a backrest on a vehicle. The vehicle has a frame; a straddle seat mounted to the frame; one of: two first posts connected to the frame on opposite sides of a longitudinal centerline of the vehicle, and two first brackets connected to the frame on opposite sides of the longitudinal centerline, each of the two first brackets defining a first slot; and one of: two second posts connected to the frame on opposite sides of the longitudinal centerline, and two second brackets connected to the frame on opposite sides of the longitudinal centerline, each of the two second brackets defining a second slot. The backrest has a back support; a first arm connected to the back support; and a second arm connected to the back support. Each of the first and second arms has a first portion, the first portion at least partially defining the first slot when the vehicle has the first post, the first portion having the first post connected thereto when the vehicle has the first bracket; a second portion slidably connected to the first portion, the second portion defining the second slot when the vehicle has the second post, the second portion having the second post connected thereto when the vehicle has the second bracket; and a biasing member biasing the first portion toward the second portion. The method comprises: inserting the first posts in the first slots; pulling the first and second arms to extend the biasing members; once the biasing members are extended: aligning the second posts with the second slots; and releasing the first and second arms such that the biasing members bias the second portions toward the first portions thereby inserting the second posts in the second slots.

In some implementations of the present technology, the first posts and the first slots are disposed forward of the second posts and the second slots.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

The present technology will be described in terms of a backrest being mounted to an on-road three-wheel vehicle having a straddle seat. However, it is contemplated that at least some aspects of the present technology could be used on other types of vehicles having a straddle seat, such as, but not limited to, motorcycles, all-terrain vehicles (ATVs), snowmobiles, and personal watercraft.

Figure 1:
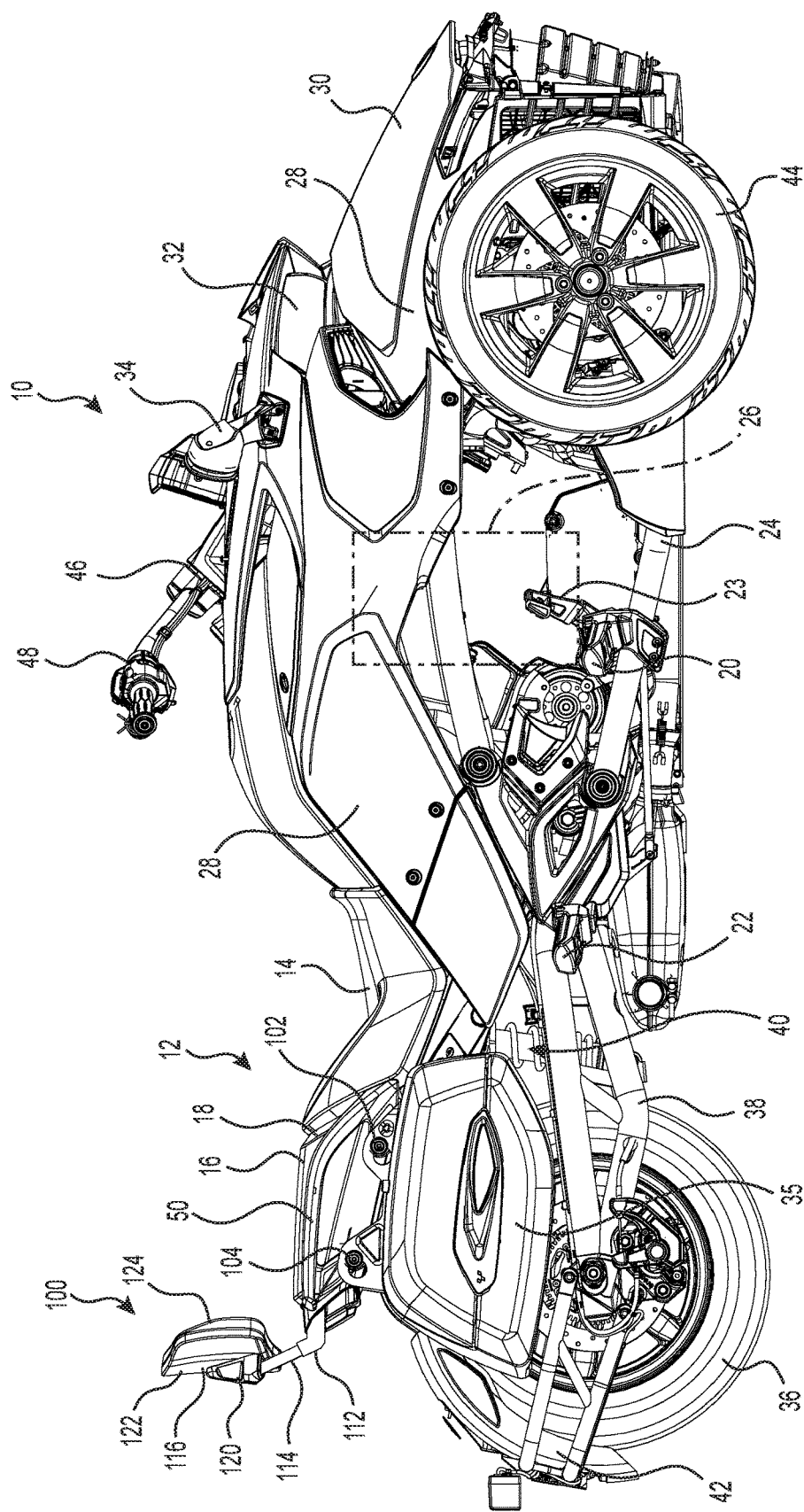
FIG. 1 is a right side elevation view of a three-wheel vehicle having a removable backrest disposed thereon.

FIG. 1 illustrates a three-wheel vehicle 10 in accordance with one implementation of the present technology. The three-wheel vehicle 10 is a straddle-type vehicle having a straddle seat 12 adapted to accommodate one or two adult sized riders. The straddle seat 12 includes a forward seat portion 14 for the driver and a rear seat portion 16 for a passenger. The rear seat portion 16 is removable from the vehicle 10. It is contemplated that the forward seat portion 14 could also be removable from the vehicle 10. It is also contemplated that the forward and rear seat portions 14, 16 could be integrally formed and that such a unitary seat could be removable or not from the vehicle 10. A handle 18 is provided, beside each side of the rear seat portion 16. A backrest 100 is connected to the frame 24 so as to provide a support for the back of a passenger sitting on the seat portion 16. The backrest 100 is removable from the frame 24 as will be described in greater detail below.

A pair of foot pegs 20 (one foot peg 20 on each side of the three-wheel vehicle 10) and a pair of foot pegs 22 (one foot peg 22 on each side of the three-wheel vehicle 10) are used by the driver and the passenger respectively, for resting their feet onto during riding. A brake pedal 23 for braking the vehicle 10 is provided above the right foot peg 20.

Figure 2:
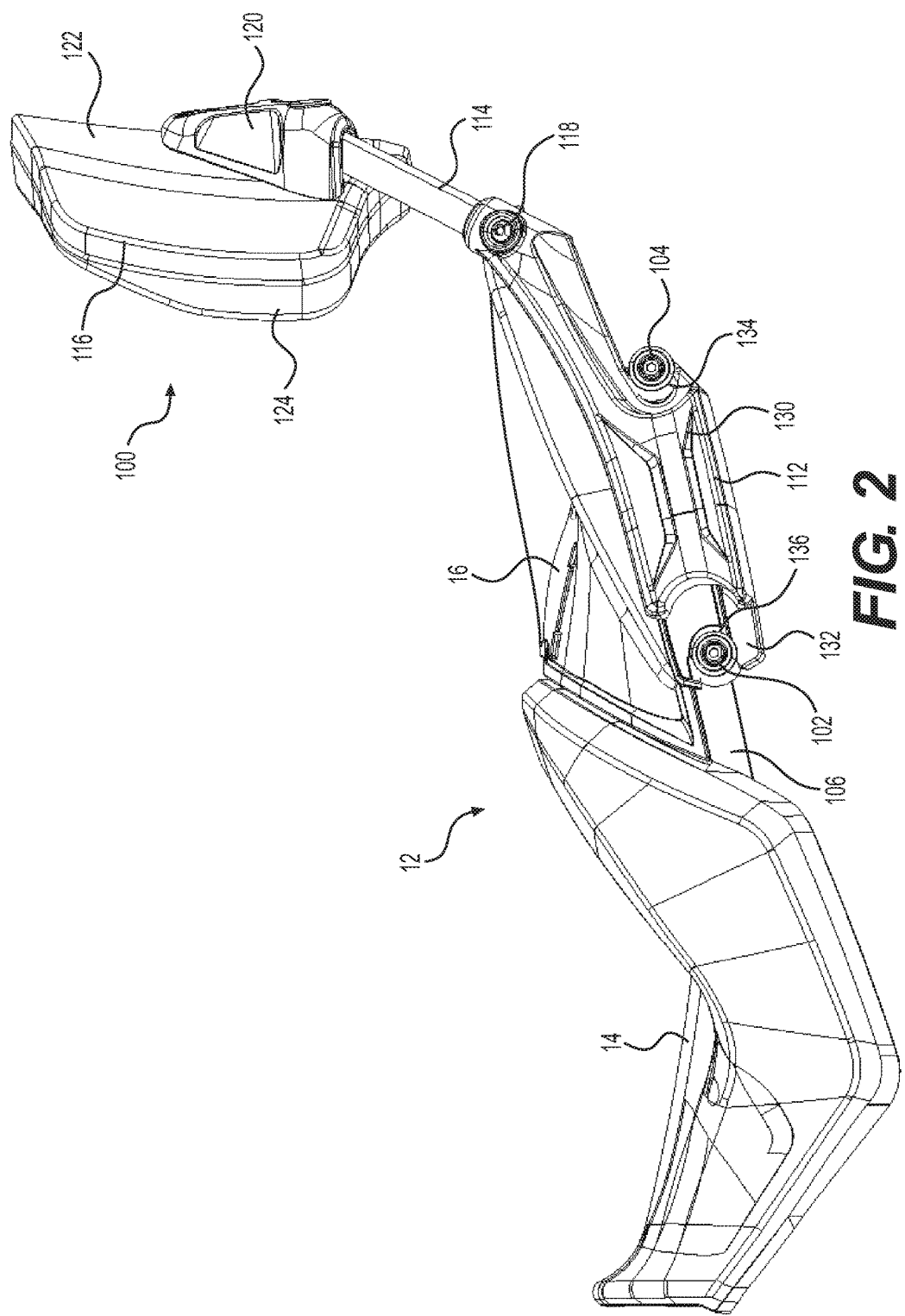
FIG. 2 is a left side elevation view of a seat and the backrest of the vehicle of FIG. 1.

The three-wheel vehicle 10 has a frame 24. As can be seen in FIG. 2, the straddle seat 12 is mounted to and supported by the frame 24. A motor 26 ((schematically shown in FIG. 1) is mounted to and supported by the frame 24 forward of the straddle seat 12. In the present implementation, the motor 26 is an internal combustion engine, but any type of power source is contemplated such as, but not limited to, an electric motor.

Body panels 28 (only some of which are labeled in FIG. 1 for clarity) are connected to the frame 24. At the front of the vehicle 10, the body panels 28 at least partially enclose the motor 26. One of the body panels 28 forms a hood 30 that can be pivoted to access a front storage box (not shown). The body panels 28 also define apertures or recesses to receive the headlights 32 (only one of which can be seen in FIG. 1) of the vehicle 10. Rearview mirrors 34 (only one of which can be seen in FIG. 1) are mounted to the body panels 28 forward of the seat 12.

Two storage container assemblies 35 are mounted to the frame 24 at a rear of the three-wheel vehicle 10 (one on each side) behind the pair of foot pegs 22. As can be seen for the right storage container assembly 35, the storage container assemblies 35 are disposed beside the seat portion 16 on either side thereof below the handles 18. It is contemplated that only one storage container assembly 35 could be provided or that they could be omitted.

A single rear wheel 36 is mounted to a swing arm 38, which forms part of the frame 24, and is suspended from the vehicle 10 via a rear suspension system 40 at the rear of the frame 24. The single rear wheel 36 is driven by the engine 26 via a belt and sprocket system and a transmission (not shown). A rear fender 42 partially covers the rear wheel 36. A pair of front wheels 44 is suspended from the front of the frame 24 via front suspension assemblies (not shown). The front wheels 44 are operatively connected to a steering column 46. The steering column 46 supports a handlebar 48, such that when the driver turns the handlebar 48 in one direction, the front wheels 44 are steered in the corresponding direction. A throttle actuator (not shown) for controlling the speed of the vehicle 10 is provided on the handlebar 48.

Figure 3:
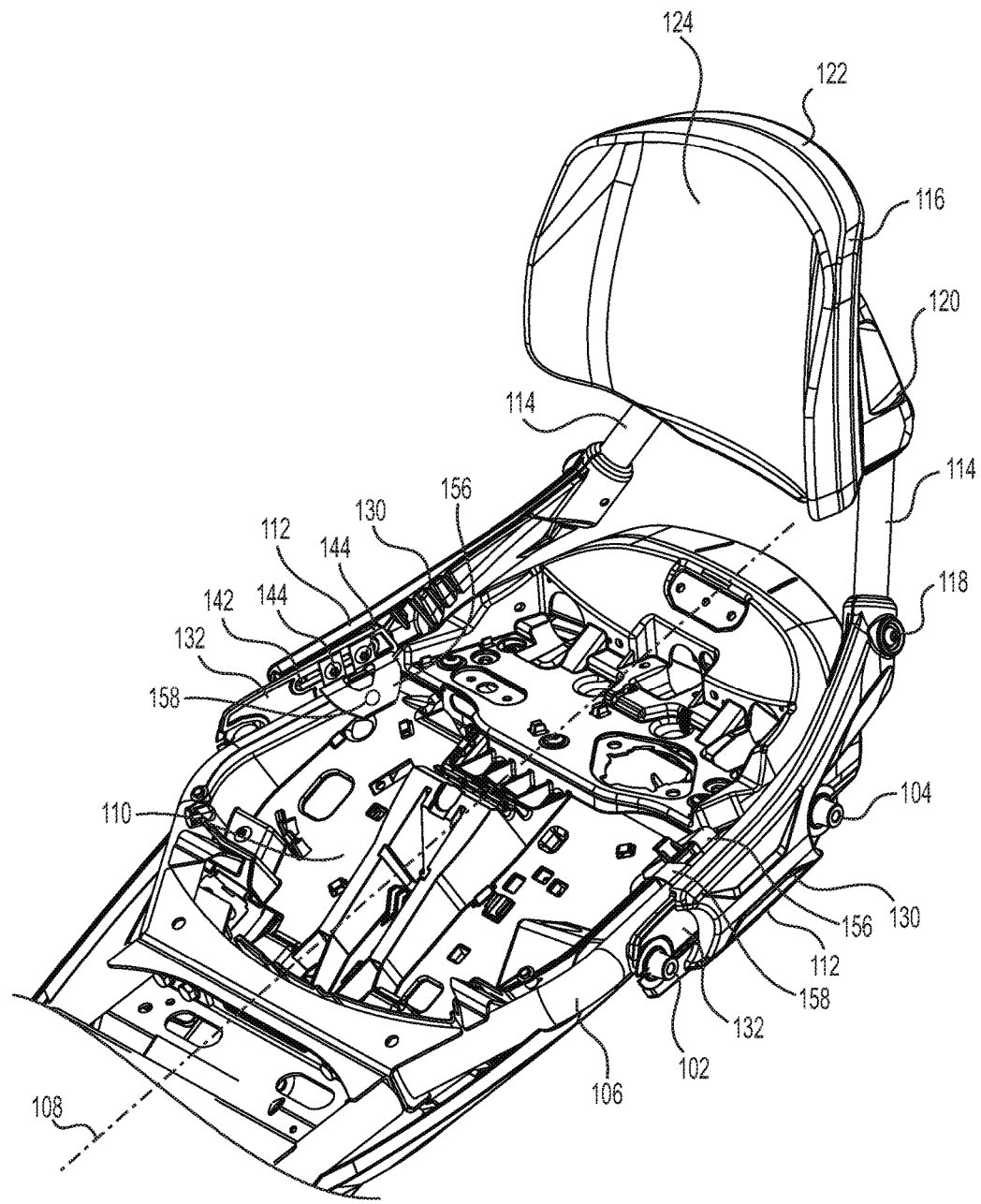
FIG. 3 is a perspective view taken from a front, left side of a portion of a frame and the backrest of the vehicle of FIG. 1.
Figure 4:
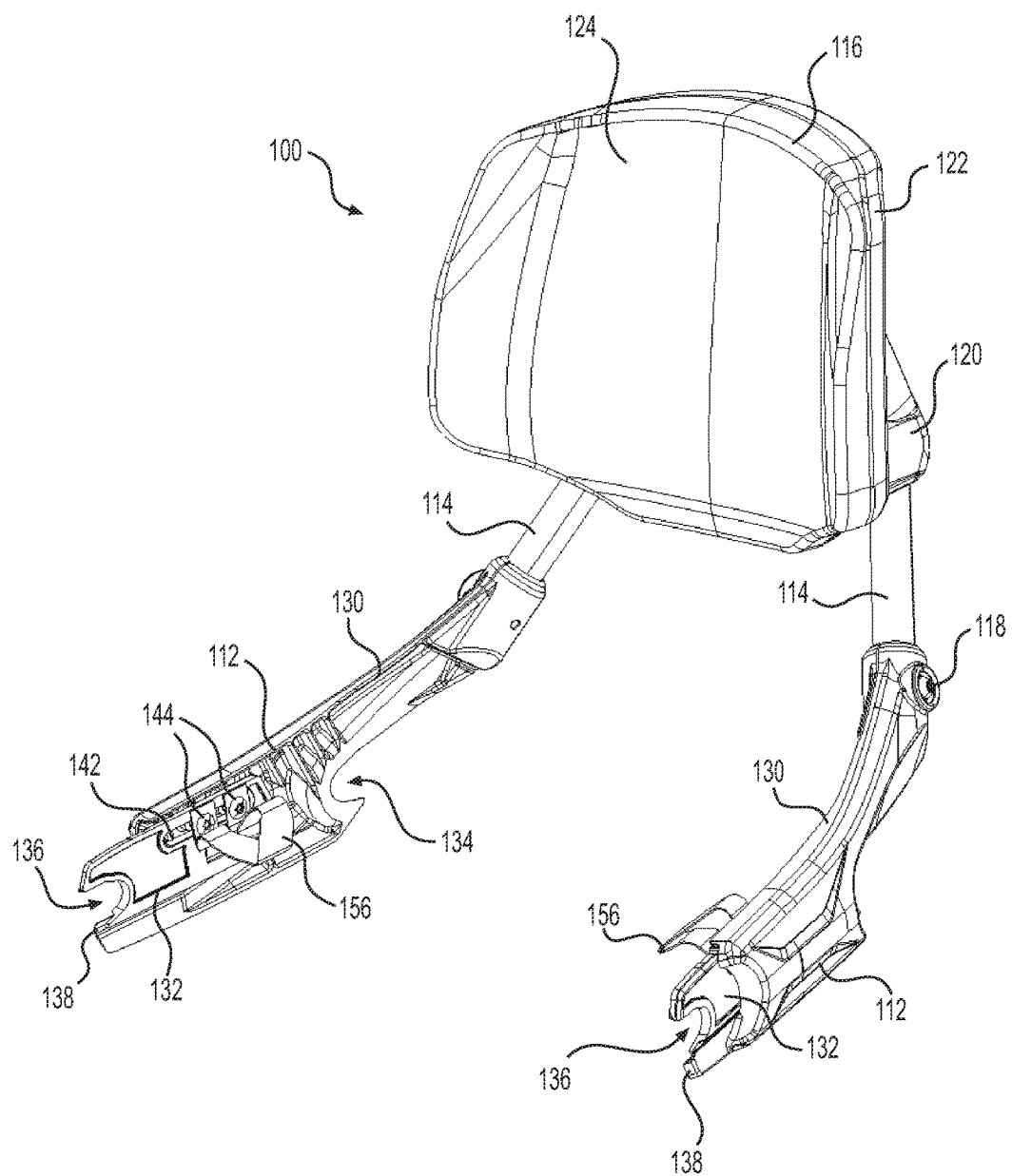
FIG. 4 is a perspective view taken from a front, left side of the backrest of the vehicle of FIG. 1.

The handles 18 are mounted to two front posts 102 (one on each side) and two rear posts 104 (one on each side) (see FIG. 2). The posts 102, 104 are fastened to the frame 24. More specifically, the posts 102, 104 are fastened to a generally U-shaped frame member 106 (FIG. 3). The posts 102, 104 are normal to a vertical plane passing through a longitudinal centerline 108 (FIG. 3) of the vehicle 10. The U-shaped frame member 106 is disposed below the rear seat portion 16 and generally follows a contour thereof. A tray 110 (FIG. 3), which forms part of the frame 24, is received within the U-shaped frame member 106 The U-shaped frame member 106 and the tray 110 support the rear seat portion 16.

The handles 18 and the portion of the frame 24 to which they are mounted will now be described in more detail. For simplicity, only the right handle 18 will be described since the left handle is a mirror image of the right handle 18.

The right handle is generally C-shaped and provides a central portion 50 that the passenger of the vehicle 10 can grasp with his/her hand. The ends (not shown) of the handle 18 define apertures (not shown) therethrough. The front end of the handle 18 is mounted to the right front post 102 and is spaced from the frame member 106. The rear end of the handle 18 is mounted to the right rear post 104 and is spaced from the frame member 106. The ends of the handle 18 are spaced from the frame member 106 in order to permit attachment of the backrest 100 to the post 102, 104 between the handle 18 and the frame member 106 as will be described in greater detail below. The posts 102, 104 protrude laterally outward from the ends of the handle 18 to form anchors used to mount the storage container assembly 35.

Turning now to FIGS. 2 to 10, the backrest 100 will be described in greater detail. The backrest 100 has left and right arms 112, left and right legs 114 and a back support 116. The arms 112 are used to selectively connect the backrest 100 to the frame 24 via the posts 102, 104 as will be described in greater detail below. The lower ends of the left and right legs 114 are received in rear portions of the left and right arms 112 respectively. Fasteners 118 are inserted through the arms 112 and legs 114 to connect the legs 114 to the arms 112. It is contemplated that the arms 112 and legs 114 could be integrally formed. The legs 114 extend rearward and upward from their respective arms 112. The upper ends of the legs 114 are received in and fastened to a pair of receptacles 120 formed by the back support 116. The back support 116 also has a rigid back plate 122 connected to the front of the receptacles 120 and a cushion 124 connected to the front of the back plate 122. The back plate 122 and the cushion 124 are curved to provide some lateral support to a passenger sitting on the rear portion 16 of the seat 12. In the present implementation, the receptacles 120 are integrally formed with the backrest 122, but it is contemplated that the receptacles 120 could be fastened, bonded or otherwise connected to the back plate 122. It is also contemplated that the receptacles 120 could be omitted and that the upper ends of the legs 114 could be fastened, or otherwise connected to, the back plate 122. It is also contemplated that two legs 114 could be a single generally U-shaped leg connecting both arms 112 to the back support 116. It is also contemplated that the legs 114 could be omitted and that the arms 112 could be connected directly to the back support 116.

The right arm 112 will now be described in more detail with reference to FIGS. 5 to 7. The left arm 112 is a mirror image of the right arm 112 and will therefore not be described in detail below. The elements of the left arm 112 that correspond to those of the right arm 112 have been labelled with the same reference numerals in the figures.

The arm 112 has a main portion 130 that is fixed to the leg 114 and a sliding portion 132 which, as the name suggests, can slide relative to the main portion 130. The main portion 130 defines a slot 134 that opens rearward. The sliding portion 132 defines a slot 136 that opens forward.

Figure 5:
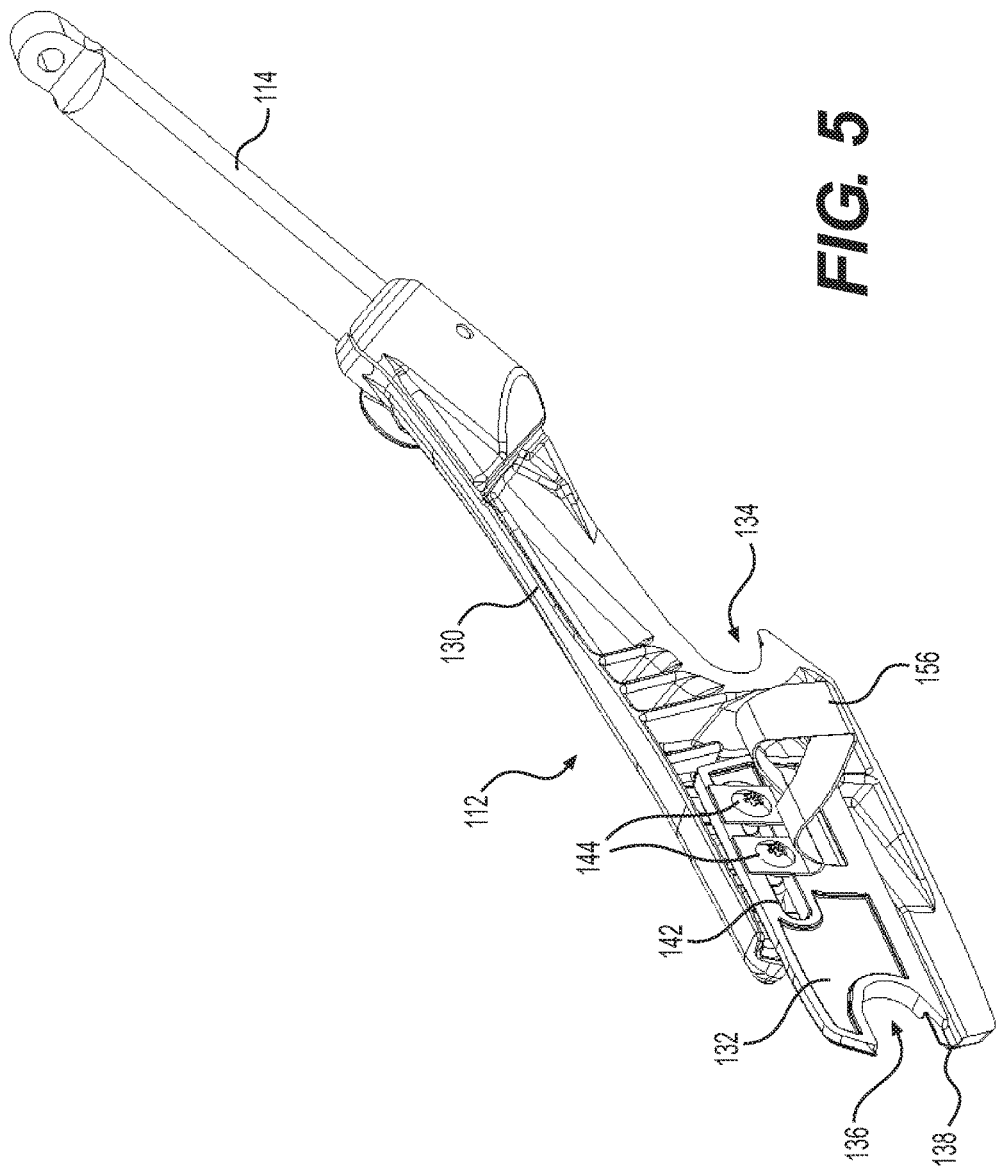
FIG. 5 is a perspective view taken from a front, left side of a right leg and a right arm of the backrest of FIG. 4.

As can be seen in FIG. 5, the sliding portion 132 is disposed laterally inward of the main portion 130. As can also be seen in FIG. 5, the sliding portion 132 sits on a rail 138 formed by the main portion 130 at a front thereof. The rail 138 also forms part of the slot 136. The rail 138 has a generally L-shaped cross-section. The lower portion of the sliding portion 132 is similarly L-shaped so as to be complementary to the shape of the rail 138. As the sliding portion 132 slides relative to the main portion 130, as will be described below, it slides along the rail 138.

Figure 6:
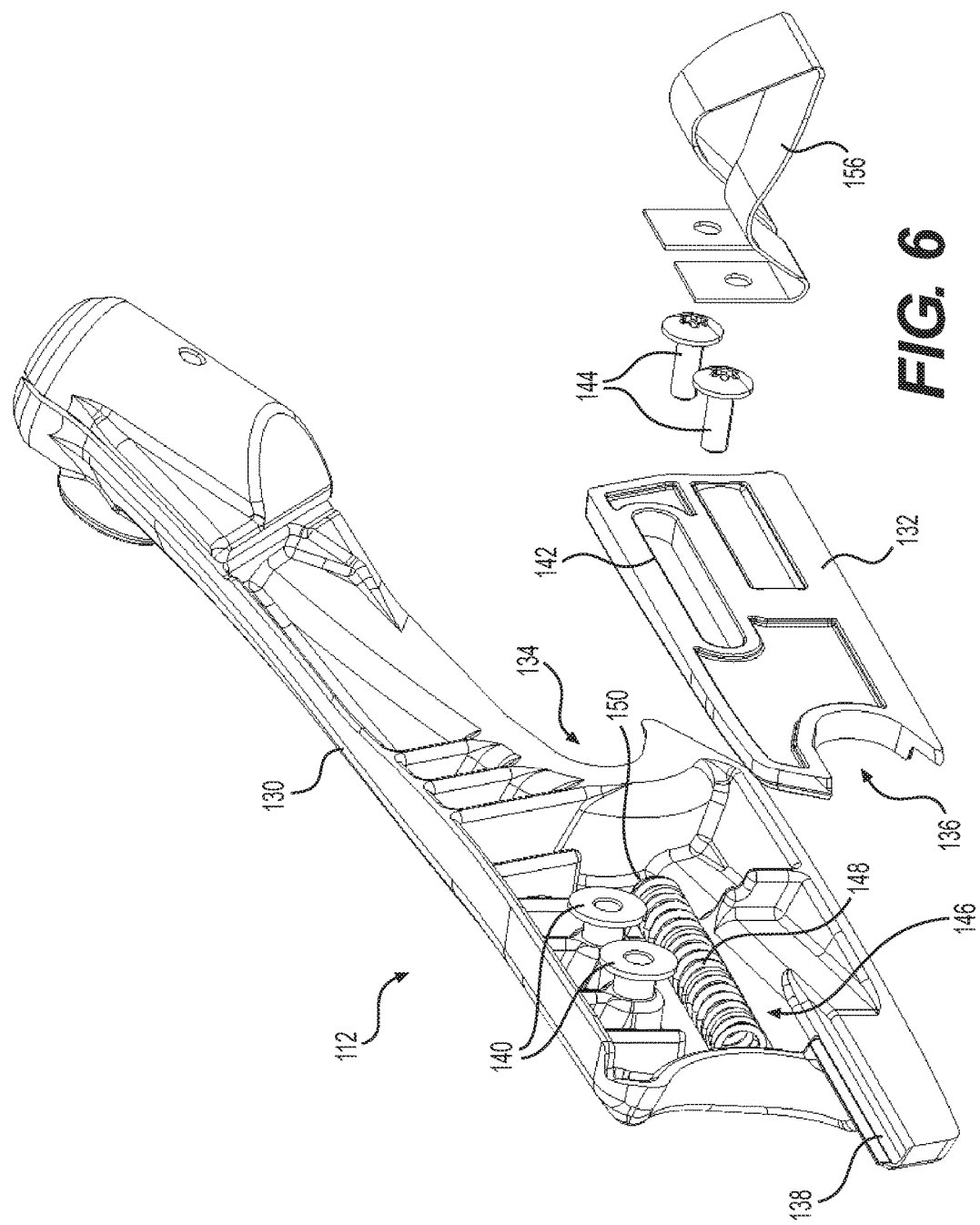
FIG. 6 is an exploded view of the right arm of FIG. 5.
Figure 7:
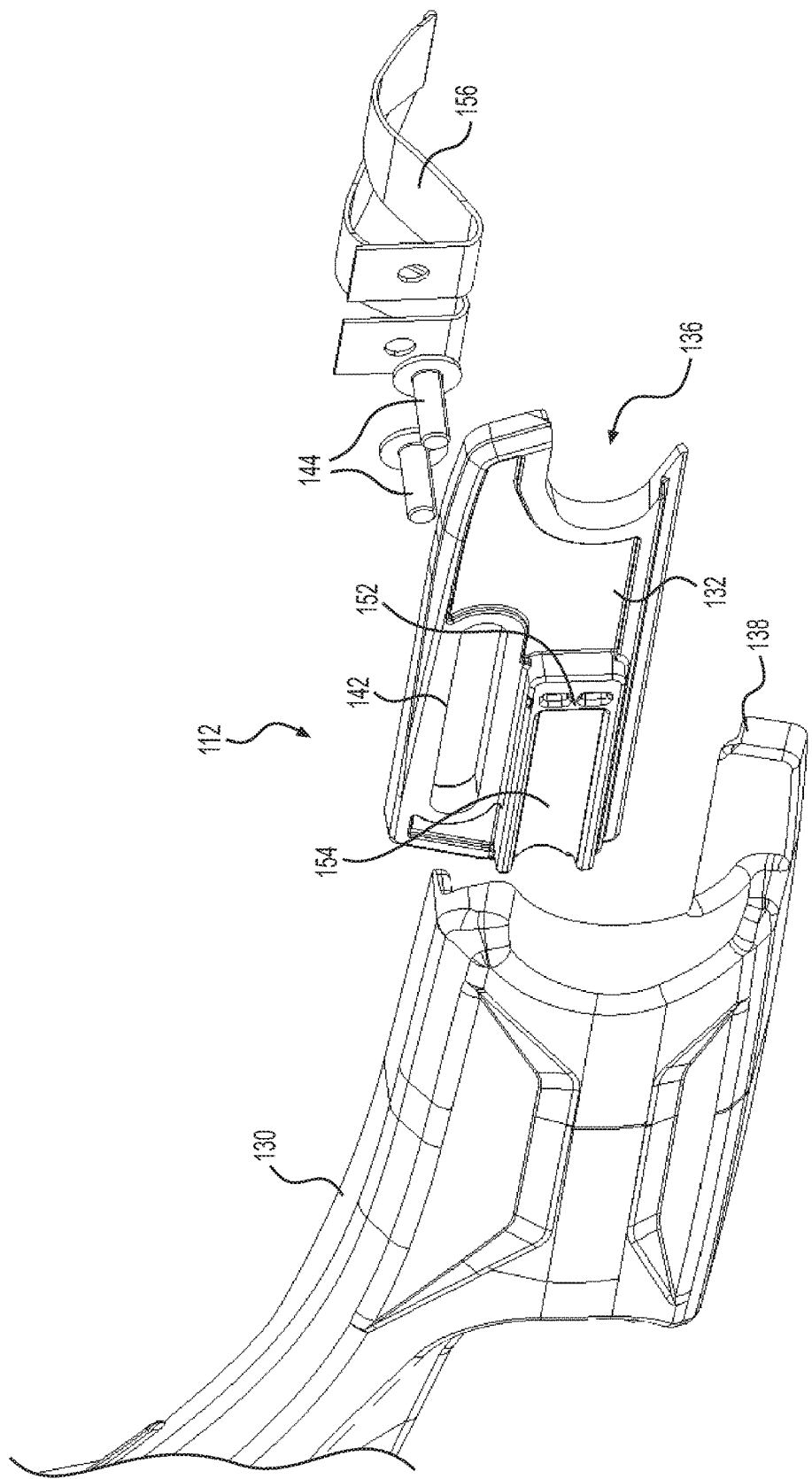
FIG. 7 is another exploded view of a portion of the right arm of FIG. 5.

In order to connect the sliding portion 132 to the main portion 130, the main portion 130 is provided with a pair of internally threaded flanged bushings 140 (FIG. 6). The sliding portion 132 defines an aperture 142 in alignment with the openings in the bushings 140. Two threaded fasteners 144 are inserted through the aperture 142 and are fastened inside the bushings, thereby slidably connecting the sliding portion 132 to the main portion 130. The length of the aperture 142 and the position of the fasteners 144 determine the limits of travel of the sliding portion 132 relative to the main portion 130. It is contemplated that the sliding portion 132 could be slidably connected to the main portion 130 in other ways.

The sliding portion 132 is disposed over a cavity 146 (FIG. 6) defined in the main portion 130. As such, the sliding portion 132 and the main portion 130 define a housing. As can be seen in FIG. 6, a biasing member, in the form of a helical spring 148, is housed in this housing. The rear end of the spring 148 abuts a wall 150 (FIG. 6) of the main portion 130. The front end of the spring 148 abuts a wall 152 (FIG. 7) disposed at front of a semi-cylindrical recess 154 formed in the laterally outer wall of the sliding portion 132. The spring 148 is partially received in the recess 154. The spring 148 biases the main portion and the sliding portion 132 away from each other. It is contemplated that the spring 148 could be replaced by other types of biasing members.

The fasteners 144 are also used to fasten a strap 156 to the main portion 130. Each end of the strap 156 is held between the head of a corresponding one of the fasteners 144 and the sliding member 132. As can be seen in FIG. 3, when the backrest 100 is installed on the vehicle 10, the strap 156 extends inward, over the tray 110, and as such is disposed under the seat portion 116 when the seat portion is installed on the vehicle 10. The strap 156 is looped around a hook 158 (FIG. 3) that extends upward and inward from the tray 110. When the seat portion is installed on the frame 24 over the strap 156, the strap 156 cannot be disengaged from the hook 158, thereby preventing the backrest 100 from being removed from the vehicle 10. It is contemplated that the strap 156 could be replaced by other types of frame-engaging members. It is also contemplated that the strap 156 could be omitted.

Figure 8:
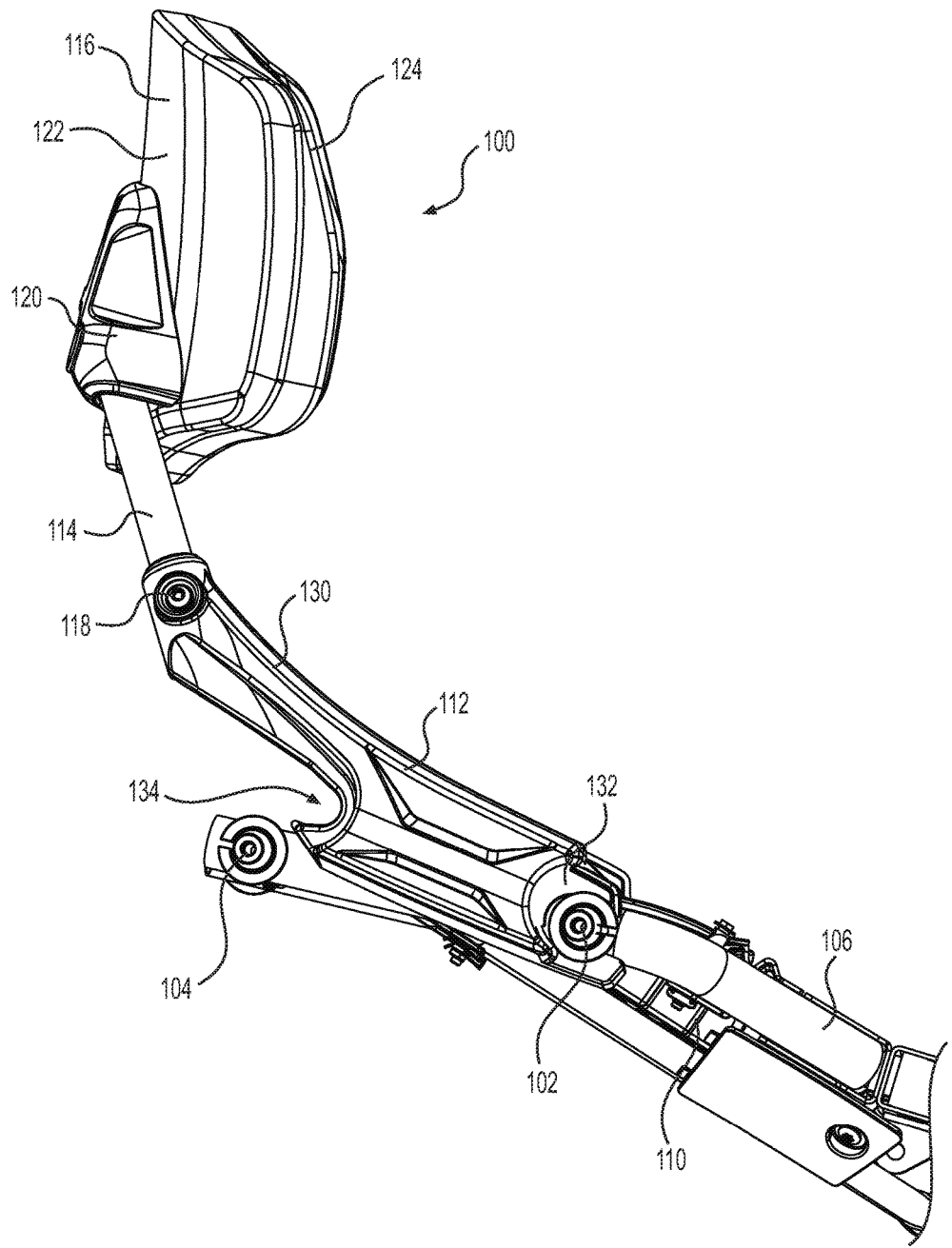
FIG. 8 is a right side elevation view of a portion of the frame and the backrest of the vehicle of FIG. 1 with the backrest shown in an initial step of an installation of the backrest on the vehicle.
Figure 9:
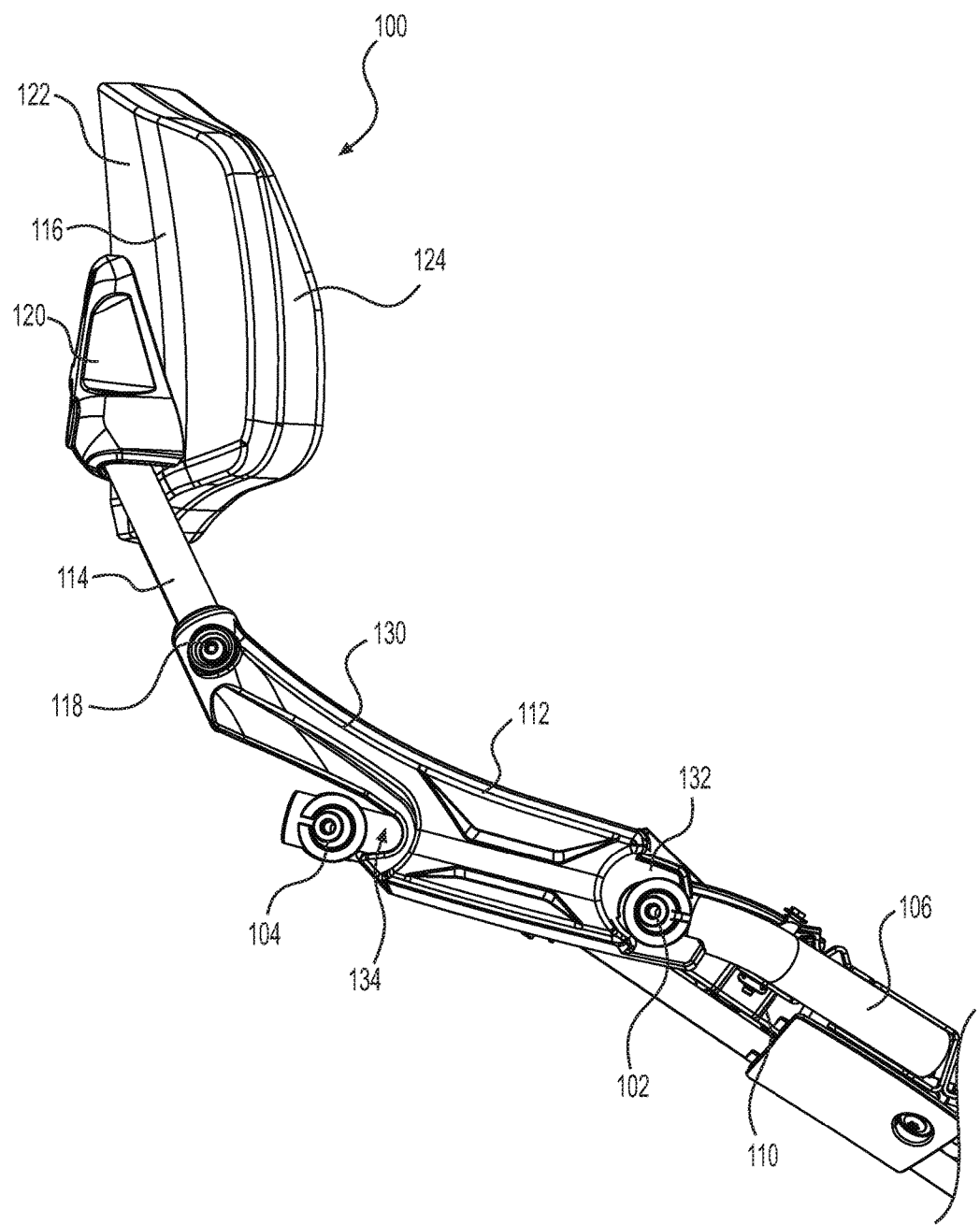
FIG. 9 is a right side elevation view of the portion of the frame and the backrest of the vehicle of FIG. 1 with the backrest shown in an intermediate step of the installation of the backrest on the vehicle.

A method for installing the backrest 100 on the vehicle 10 and a method for removing the backrest 100 from the vehicle 10 will now be described with respect to FIGS. 8 to 10.

To install the backrest 100 on the vehicle 10, the rear seat portion 16 is first removed. It is contemplated that the rear seat portion 16 could remain on the vehicle 10 should the straps 156 be omitted. The arms 112, together with the rest of the backrest 100, are moved between the frame member 106 and the front end of the handles 18 at an angle from behind the posts 102 toward the posts 102 such that the posts 102 are inserted into the slots 136 in the sliding portions 132. Once the posts 102 abut the sliding portions 132, the arms 112 continue to be pushed toward the posts 102 such that the main portions 130 of the arms 112 move forward relative to the sliding portions 132 as can be seen as FIG. 8. As result, the springs 148 are compressed between the main portions 130 and the sliding portions 132 and the distance between the slots 134, 136 is shortened. Then, as can be seen in FIG. 9, while continuing to push the arms 112 against the posts 102, the backrest 100 is pivoted down about the posts 102 in order to align the posts 104 with the slots 134 of the main portions 130. It should be noted that the slots 134 are slightly flared such that perfect alignment of the posts 104 with the slots 134 is not necessary, however it is contemplated that this feature could be omitted. Then, the pressure applied on the arms 112 toward the posts 102 is released. As a result, the springs 148 bias the main portions 130 rearward such that the posts 104 are inserted into the slots 134 of the arms 212 disposed between the frame member 106 and the rear end of the handle 18. The main portions 130 continue to move backward until the posts 104 abut the main portions 130 as shown in FIG. 10. The straps 156 are now disposed over the tray 110 and are looped around the hooks 158. The rear seat portion 16 is finally installed on the frame 24 over the tray 110, where it is locked in position via a locking mechanism (not shown).

Figure 10:
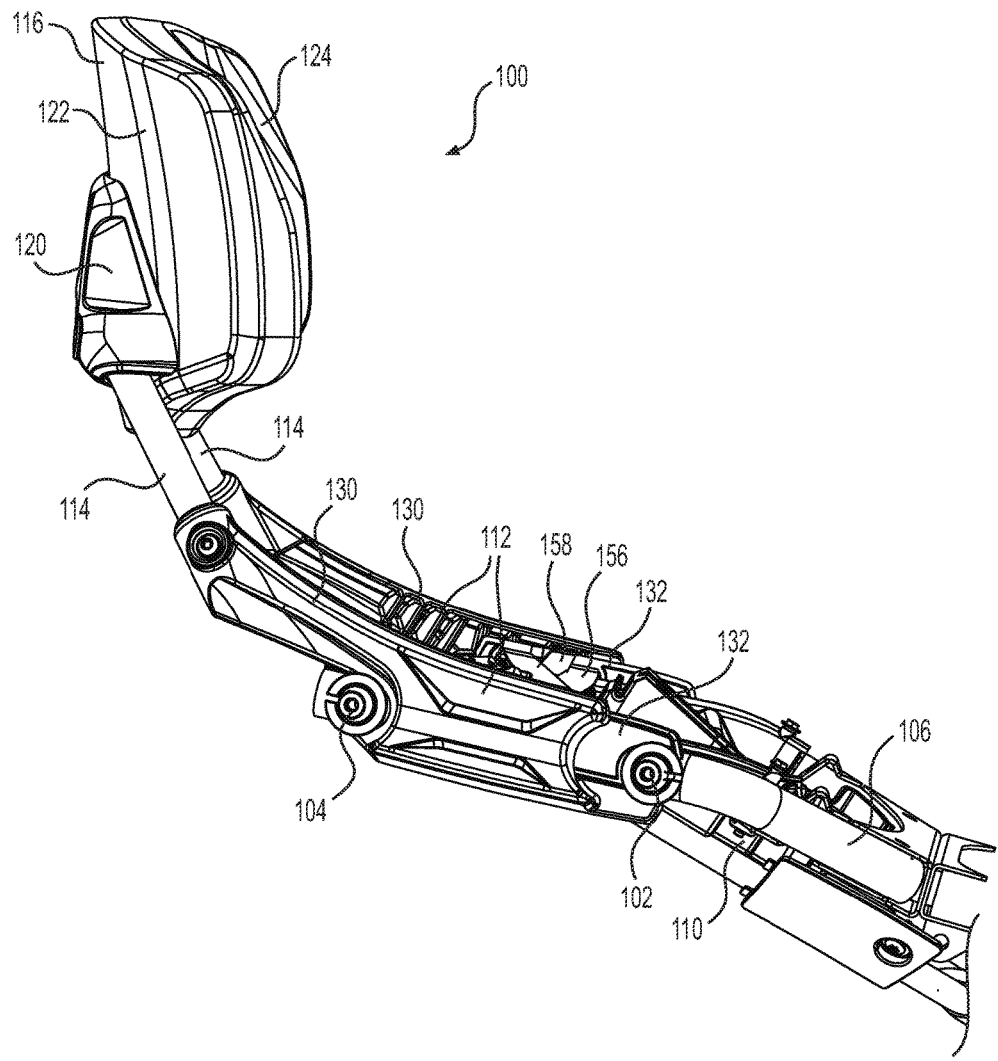
FIG. 10 is an elevated right side view of the portion of the frame and the backrest of the vehicle of FIG. 1 with the backrest shown in a final step of the installation of the backrest on the vehicle.

When the backrest 100 is installed on the vehicle 10 as shown in FIG. 10, the arms 112 are effectively shorter than when the backrest 100 is removed from the vehicle 10. This is because the distance between the posts 102 and the posts 104 is slightly less than the distance between the slots 134, 136 when the backrest 100 is removed from the vehicle 10 and the springs 148 are uncompressed. As a result, when the backrest 100 is installed on the vehicle 10, the springs 148 are slightly compressed and bias the main portions 130 against the posts 104 and the sliding portions 132 against the posts 102.

To remove the backrest 100 from the vehicle 10, the rear seat portion 16 is first removed and the straps 156 disengaged from the hooks 158. The arms 112, together with the rest of the backrest 100, are pushed against the posts 102. Then, while continuing to push the arms 112 against the posts 102, the backrest 100 is pivoted up about the posts 102. The backrest 100 can then be pulled back from the post 102 to be removed. The rear seat portion 16 is then reinstalled on the vehicle 10.

Turning now to FIGS. 11 to 17, various alternative implementations of the arms 112 of the backrest 100 will be described. As the arms in the implementations described below are mirror images of each other, only a right arm will be described. Elements of the arms described below that are similar to those of the arms 112 described above or to those of another one of the implementations described below have been labeled with the same reference numerals in these figures. FIGS. 11 to 17 are schematic representations of alternative implementations of the arms 112. As such, they do not illustrate many of the features present in the arms 112 described above, such as the elements and features slidably connecting the sliding and main portions together and the straps. However, it should be understood that these elements and features, or elements and features similar to those present in the arms 112, are nonetheless present in these alternative implementations.

Figure 11:
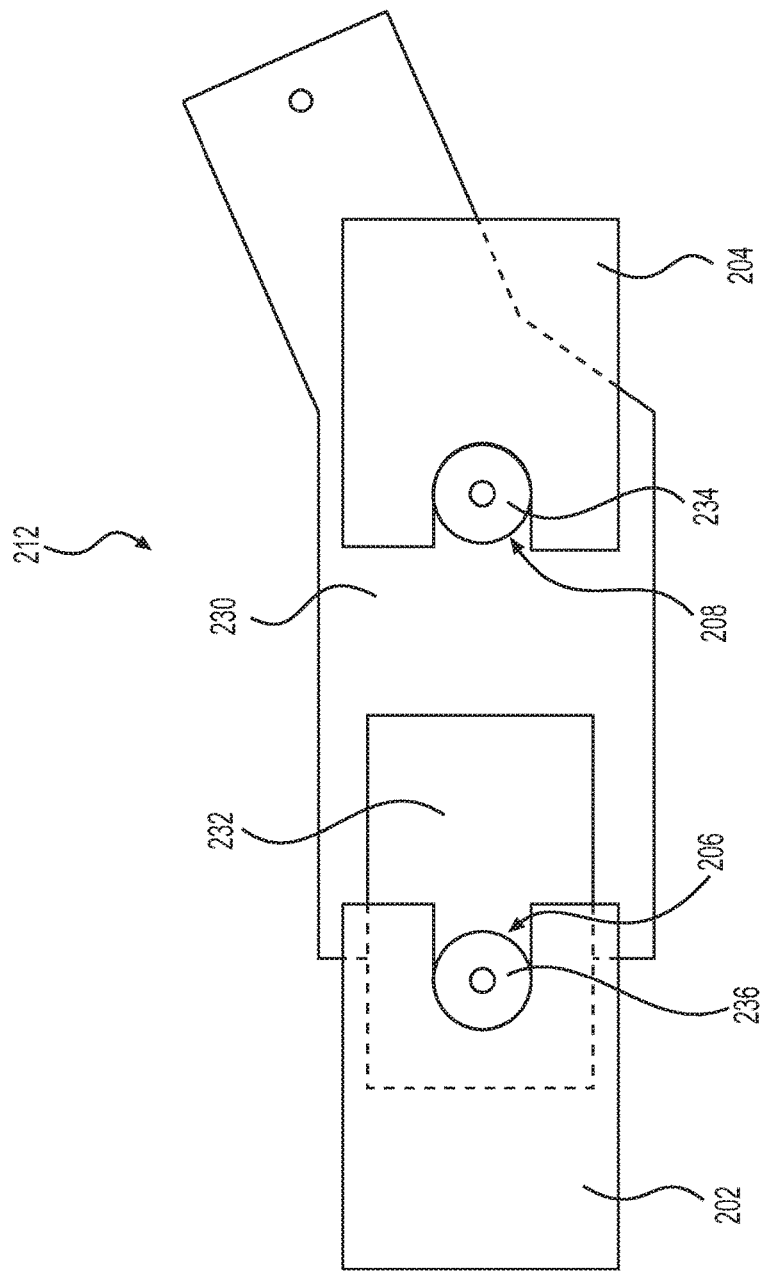
FIG. 11 is a left side elevation view of a schematic illustration of an alternative implementation of a right arm of the backrest of FIG. 4 and associated brackets.

FIG. 11 illustrates an arm 212. The arm 212 has a main portion 230 that is fixed to the leg 114 and a sliding portion 232 which, as the name suggests, can slide relative to the main portion 230. A post 234 is connected to the main portion 230 and extends laterally inward thereof. A post 236 is connected to the sliding portion 232 and extends laterally inward thereof. A biasing member (not shown), such as a helical spring, biases the portions 230, 232 away from each other.

In this implementation, the posts 102, 104 connected to the frame 24 have been replaced by front brackets 202 and rear brackets 204 connected to the frame member 106 on each side of the longitudinal centerline 108. It is contemplated that the brackets 202, 204 could be integrally formed with the frame 24. Each front bracket 202 defines a slot 206 that opens rearward. Each rear bracket 204 defines a slot 208 that opens forward.

To install a backrest having the arms 212 on the vehicle 10, the rear seat portion 16 is first removed. The arms 212, together with the rest of the backrest, are moved at an angle to insert the posts 236 into the slots 206. Once the posts 236 abut the brackets 202, the arms 212 continue to be pushed toward the brackets 202 such that the main portions 230 of the arms 212 move forward relative to the sliding portions 232. As result, the biasing members are compressed between the main portions 230 and the sliding portions 232 and the overall length of the arms 212 is shortened. Then, while continuing to push the arms 212 against the brackets 202, the backrest is pivoted down about the posts 236 in order to align the posts 234 with the slots 208 of the rear brackets 204. Then, the pressure applied on the arms 212 toward the brackets 202 is released. As a result, the biasing members bias the main portions 230 rearward such that the posts 234 are inserted into the slots 208 of the brackets 204. The rear seat portion 16 is finally installed on the frame 24 over the tray 110.

To remove the backrest having the arms 212 from the vehicle 10, the rear seat portion 16 is first removed. The arms 212, together with the rest of the backrest, are pushed against the brackets 202. Then, while continuing to push the arms 212 against the brackets 202, the backrest is pivoted up about the posts 236. The backrest can then be pulled back from the brackets 202 to be removed. The rear seat portion 16 is then reinstalled on the vehicle 10.

Figure 12:
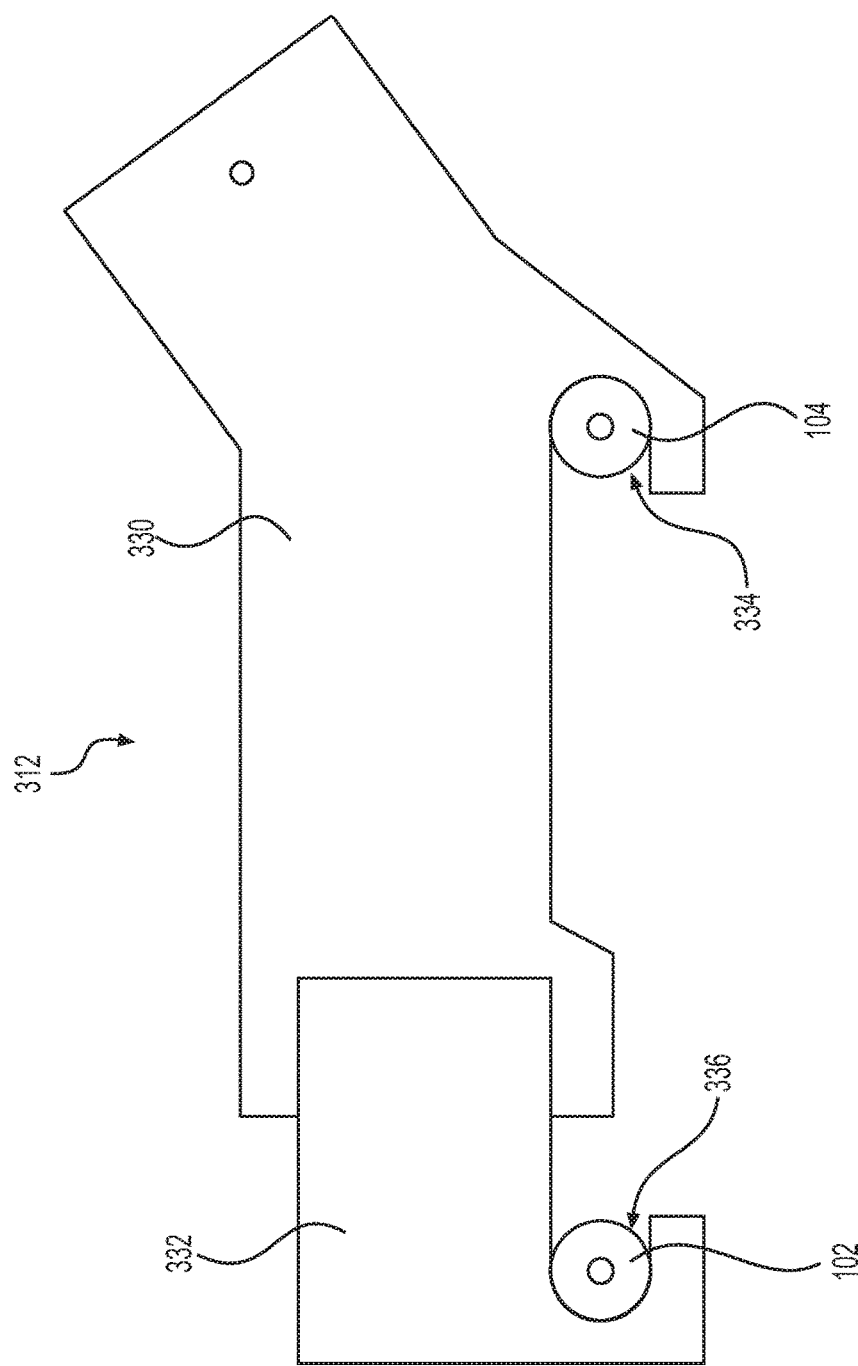
FIG. 12 is a left side elevation view of a schematic illustration of another alternative implementation of a right arm of the backrest of FIG. 4 and associated posts.

FIG. 12 illustrates an arm 312. The arm 312 has a main portion 330 that is fixed to the leg 114 and a sliding portion 332 which, as the name suggests, can slide relative to the main portion 330. The main portion 330 defines a slot 334 that opens forward. The sliding portion 332 defines a slot 336 that opens rearward. A biasing member (not shown), such as a helical spring, biases the portions 330, 332 toward each other.

To install a backrest having the arms 312 on the vehicle 10, the rear seat portion 16 is first removed. The arms 312, together with the rest of the backrest, are moved rearward at an angle to insert the posts 102 into the slots 336. Once the posts 102 abut the sliding portions 332, the arms 312 continue to be pulled away from the posts 102 such that the main portions 330 of the arms 312 move rearward relative to the sliding portion 332. As result, the biasing members are extended between the main portions 330 and the sliding portions 332 and the overall length of the arms 312 is lengthened. Then, while continuing to pull the arms 312 away from the posts 102, the backrest is pivoted down about the posts 102 in order to align the posts 104 with the slots 334 of the main portions 330. Then, the arms 312 are released. As a result, the biasing members bias the main portions 330 forward such that the posts 104 are inserted into the slots 334 of the main portions 330. The rear seat portion 16 is finally installed on the frame 24 over the tray 110.

To remove the backrest having the arms 312 from the vehicle 10, the rear seat portion 16 is first removed. The arms 312, together with the rest of the backrest, are pulled rearward away from the posts 102. Then, while continuing to pull the arms 312 away from the posts 102, the backrest is pivoted up about the posts 102. The backrest can then be pushed forward to be removed. The rear seat portion 16 is then reinstalled on the vehicle 10.

Figure 13:
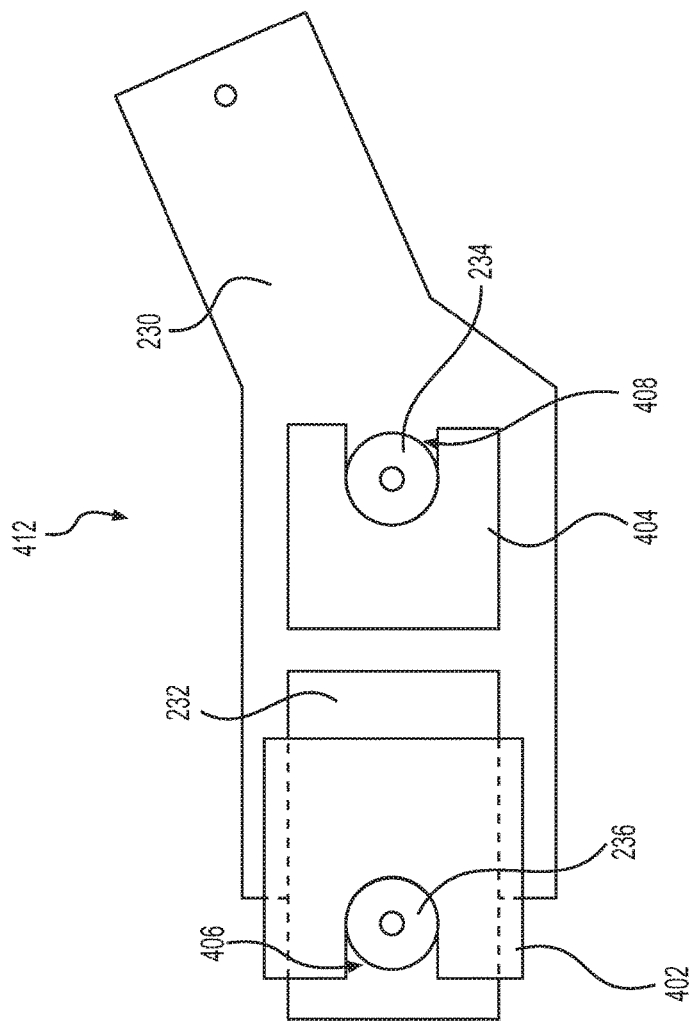
FIG. 13 is a left side elevation view of a schematic illustration of another alternative implementation of a right arm of the backrest of FIG. 4 and associated brackets.

FIG. 13 illustrates an arm 412. The arm 412 has the main portion 230, the sliding portion 232, the post 234 and the post 236 described above with respect to FIG. 11. A biasing member (not shown), such as a helical spring, biases the portions 230, 232 toward each other.

In this implementation, the posts 102, 104 connected to the frame 24 have been replaced by front brackets 402 and rear brackets 404 connected to the frame member 106 on each side of the longitudinal centerline 108. It is contemplated that the brackets 402, 404 could be integrally formed with the frame 24. Each front bracket 402 defines a slot 406 that opens forward. Each rear bracket 404 defines a slot 408 that opens rearward.

To install a backrest having the arms 412 on the vehicle 10, the rear seat portion 16 is first removed. The arms 412, together with the rest of the backrest, are moved rearward at an angle to insert the posts 236 into the slots 406. Once the posts 236 abut the brackets 402, the arms 412 continue to be pulled away from the brackets 402 such that the main portions 430 of the arms 412 move rearward relative to the sliding portion 432. As result, the biasing members are extended between the main portions 430 and the sliding portions 432 and the overall length of the arms 412 is lengthened. Then, while continuing to pull the arms 412 away from the brackets 402, the backrest is pivoted down about the posts 236 in order to align the posts 234 with the slots 408 of the rear brackets 404. Then, the arms 412 are released. As a result, the biasing members bias the main portions 430 forward such that the posts 234 are inserted into the slots 408 of the rear brackets 404. The rear seat portion 16 is finally installed on the frame 24 over the tray 110.

To remove the backrest having the arms 412 from the vehicle 10, the rear seat portion 16 is first removed. The arms 412, together with the rest of the backrest, are pulled rearward away from the brackets 402. Then, while continuing to pull the arms 412 away from the brackets 402, the backrest is pivoted up about the posts 236. The backrest can then be pushed forward to be removed. The rear seat portion 16 is then reinstalled on the vehicle 10.

Figure 14:
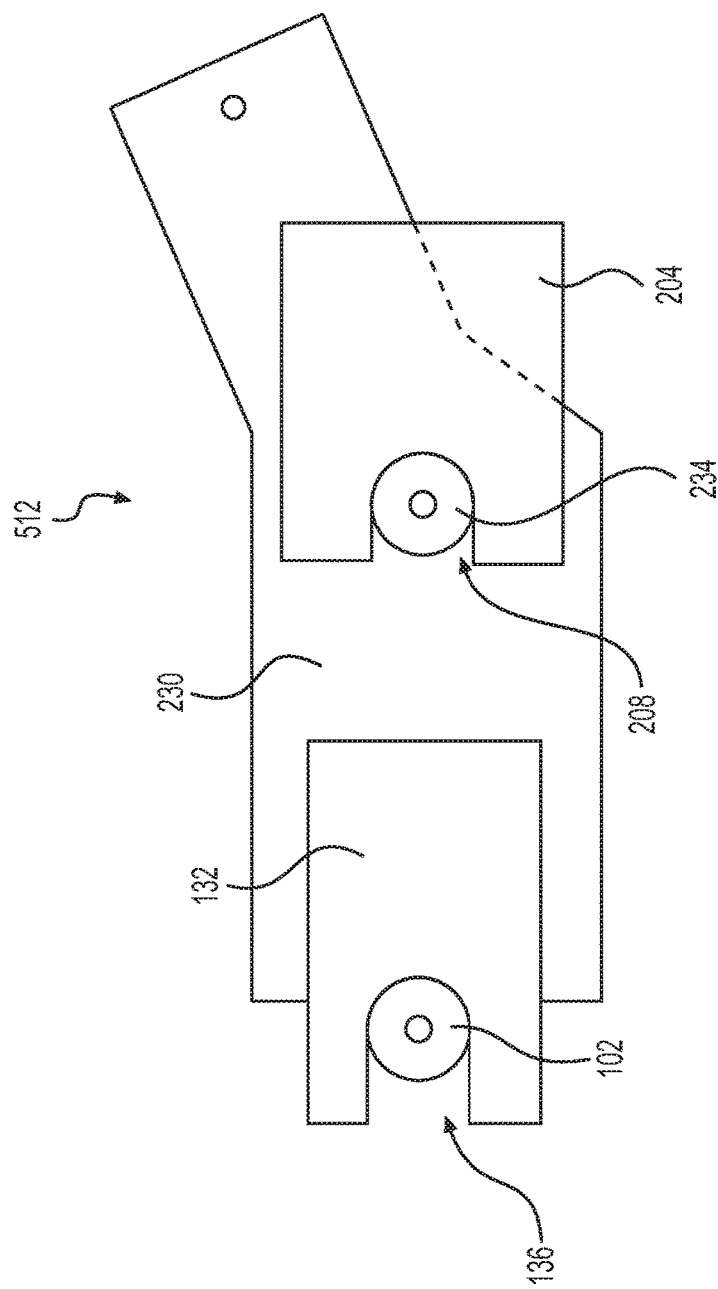
FIG. 14 is a left side elevation view of a schematic illustration of another alternative implementation of a right arm of the backrest of FIG. 4 and an associated post and an associated bracket.

FIG. 14 illustrates an arm 512. The arm 512 has the sliding portion 132 of the arm 112 described above and the main portion 230 and the post 234 described above with respect to FIG. 11. A biasing member (not shown), such as a helical spring, biases the portions 230, 132 away from each other.

In this implementation, the posts 104 connected to the frame 24 have been replaced by the rear brackets 204 having the slots 234 described above with respect to FIG. 11. The posts 102 are provided on the frame 24.

To install the backrest having the arms 512 on the vehicle 10, the rear seat portion 16 is first removed. The arms 512, together with the rest of the backrest, are moved at an angle from behind the posts 102 toward the posts 102 such that the posts 102 are inserted into the slots 136 in the sliding portions 132. Once the posts 102 abut the sliding portions 132, the arms 112 continue to be pushed toward the posts 102 such that the main portions 230 of the arms 512 move forward relative to the sliding portions 132. As result, the biasing members are compressed between the main portions 230 and the sliding portions 132 and the overall length of the arms 112 is shortened. Then, while continuing to push the arms 512 against the posts 102, the backrest is pivoted down about the posts 102 in order to align the posts 234 with the slots 208 of the rear brackets. Then, the pressure applied on the arms 512 toward the posts 102 is released. As a result, the biasing members bias the main portions 230 rearward such that the posts 234 are inserted into the slots 208 of the rear brackets 204. The main portions 230 continue to move backward until the posts 208 abut the rear brackets 204. The rear seat portion 16 is finally installed on the frame 24 over the tray 110.

To remove the backrest having the arms 512 from the vehicle 10, the rear seat portion 16 is first removed. The arms 512, together with the rest of the backrest, are pushed against the posts 102. Then, while continuing to push the arms 512 against the posts 102, the backrest is pivoted up about the posts 102. The backrest can then be pulled back from the post 102 to be removed. The rear seat portion 16 is then reinstalled on the vehicle 10.

Figure 15:
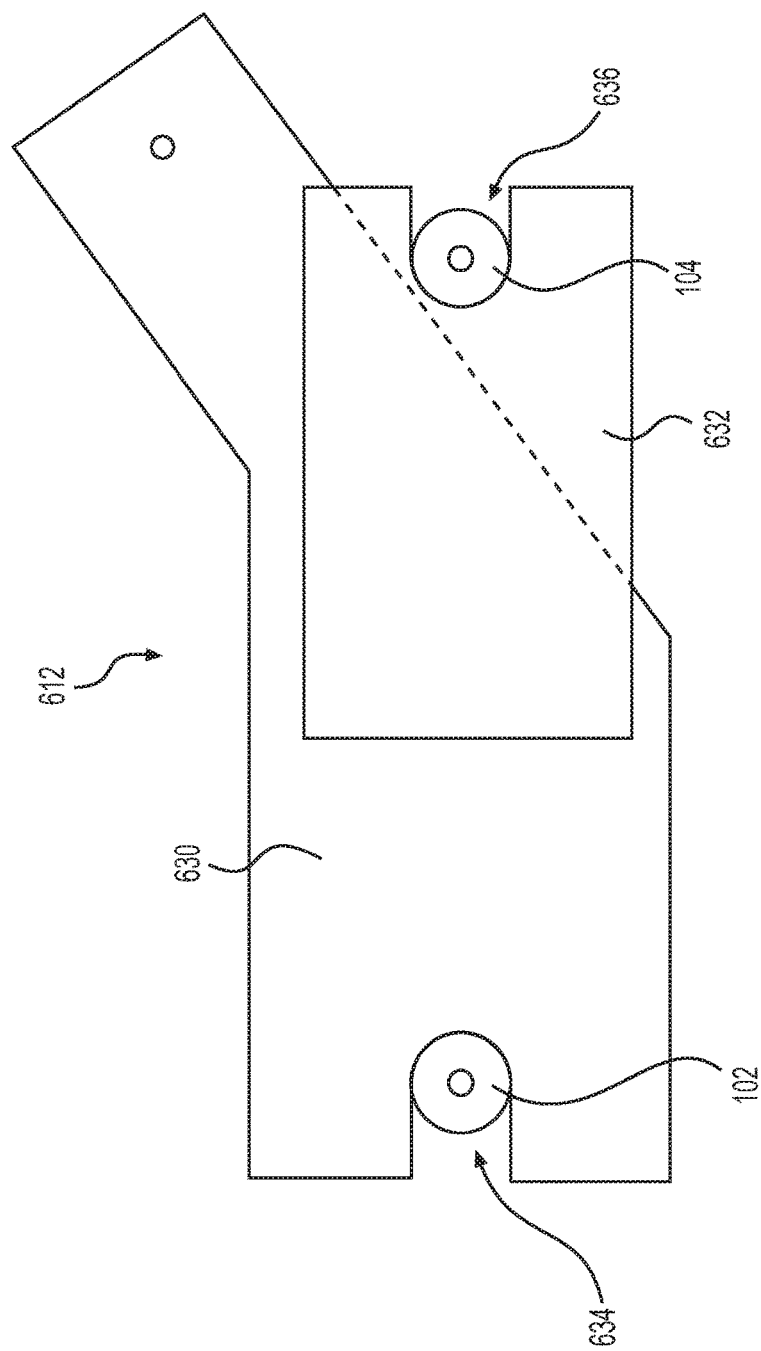
FIG. 15 is a left side elevation view of a schematic illustration of another alternative implementation of a right arm of the backrest of FIG. 4 and associated posts.

FIG. 15 illustrates an arm 612. The arm 612 has a main portion 630 that is fixed to the leg 114 and a sliding portion 632 which, as the name suggests, can slide relative to the main portion 630. In this implementation, the sliding portion is disposed at the rear of the arm 612. The main portion 630 defines a slot 634 at a front thereof that opens forward. The sliding portion 632 defines a slot 636 at a rear thereof that opens rearward. A biasing member (not shown), such as a helical spring, biases the portions 630, 632 away from each other.

To install a backrest having the arms 612 on the vehicle 10, the rear seat portion 16 is first removed. The arms 612, together with the rest of the backrest, are moved at an angle to insert the posts 104 into the slots 636 of the sliding portions 632. Once the posts 104 abut the sliding portions 632, the arms 612 continue to be pushed rearward toward the posts 104 such that the main portions 630 of the arms 612 move rearward relative to the sliding portions 632. As result, the biasing members are compressed between the main portions 630 and the sliding portions 632 and the overall length of the arms 612 is shortened. Then, while continuing to push the arms 612 rearward against the posts 104, the backrest is pivoted down about the posts 104 in order to align the posts 102 with the slots 634 of the main portions 630. Then, the pressure applied on the arms 612 toward the posts 104 is released. As a result, the biasing members bias the main portions 630 forward such that the posts 102 are inserted into the slots 634 of the main portions. The rear seat portion 16 is finally installed on the frame 24 over the tray 110.

To remove the backrest having the arms 612 from the vehicle 10, the rear seat portion 16 is first removed. The arms 612, together with the rest of the backrest, are pushed rearward against the posts 104. Then, while continuing to push the arms 612 against the posts 104, the backrest is pivoted up about the posts 104. The backrest can then be pushed away from the posts 104 to be removed. The rear seat portion 16 is then reinstalled on the vehicle 10.

Alternative implementations of the arms 612 are contemplated. Examples of these alternative implementations correspond to implementations similar to those illustrated in FIGS. 11 to 14, but modified to take into account that the sliding portion 632 of the arm 612 is disposed at the rear of the main portion 630.

Figure 16:
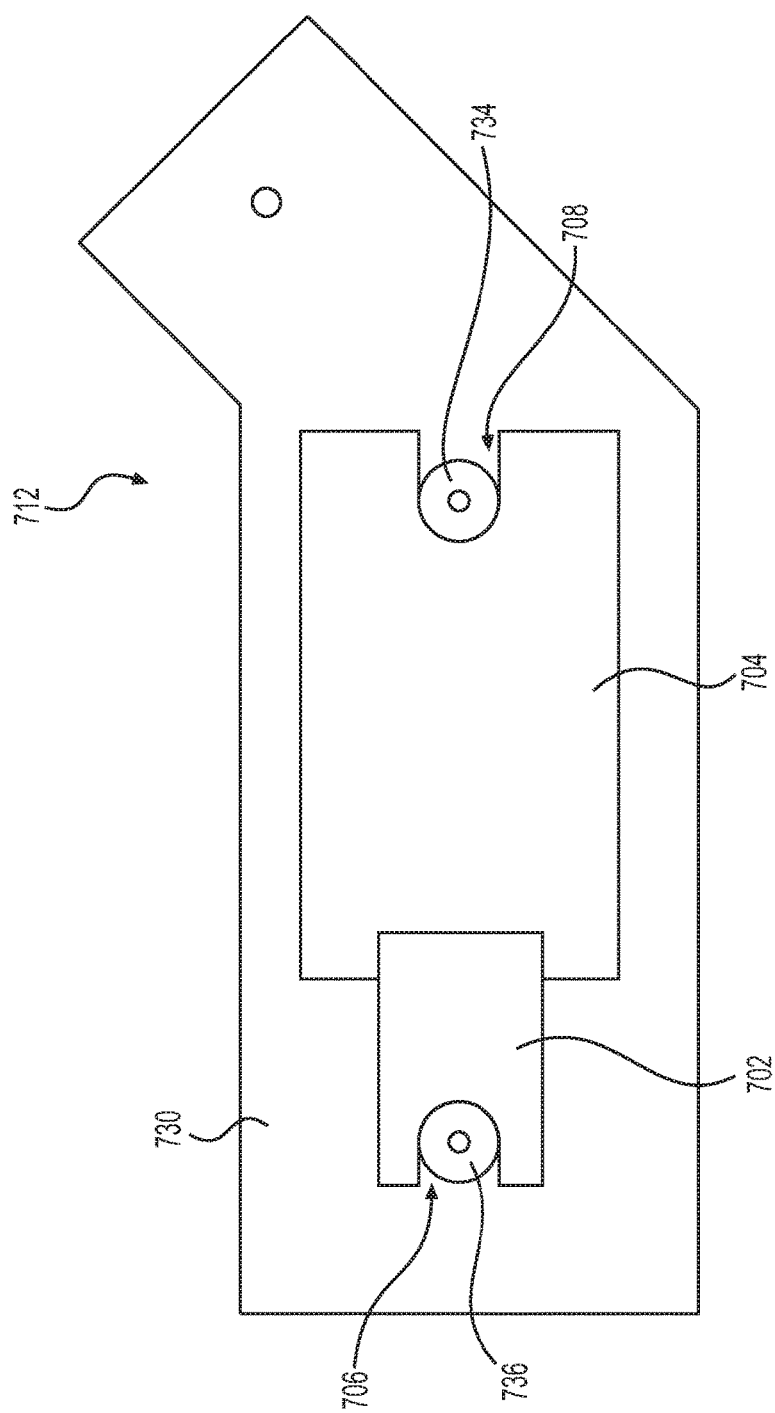
FIG. 16 is a left side elevation view of a schematic illustration of another alternative implementation of a right arm of the backrest of FIG. 4 and associated brackets.

FIG. 16 illustrates an arm 712. The arm 712 only has a main portion 730 with two posts 734, 736 connected to it and extending laterally inwardly therefrom. The arm 712 does not have a sliding portion.

In this implementation, the posts 102, 104 connected to the frame 24 have been replaced by front brackets 702 and rear brackets 704. Each front bracket 702 is slidable relative to its corresponding rear bracket 704, and a biasing member (not shown), such as a helical spring, biases the brackets 702, 704 away from each other. The brackets 704 are fixed to the frame 24. It is contemplated that the brackets 704 could be integrally formed with the frame 24. In an alternative implementation, it is contemplated that the brackets 702 could be fixed to the frame 24 and that the bracket 704 could slide relative to the brackets 702. Each front bracket 702 defines a slot 706 that opens forward. Each rear bracket 704 defines a slot 708 that opens rearward.

To install a backrest having the arms 712 on the vehicle 10, the rear seat portion 16 is first removed. The arms 712, together with the rest of the backrest, are moved rearward at an angle to insert the posts 736 into the slots 706. Once the posts 736 abut the brackets 702, the arms 712 continue to be pulled rearward such that the brackets 702 move rearward relative to the brackets 704. As result, the biasing members are compressed between the brackets 702, 704 and the overall distance between the slots 706, 708 is reduced. Then, while continuing to pull the arms 712 rearward, the backrest is pivoted down about the posts 736 in order to align the posts 734 with the slots 708 of the rear brackets 704. Then, the arms 712 are released. As a result, the biasing members bias the front brackets 702 and the main portions 830 forward such that the posts 734 are inserted into the slots 708 of the rear brackets 704. The rear seat portion 16 is finally installed on the frame 24 over the tray 110.

To remove the backrest having the arm 712 from the vehicle 10, the rear seat portion 16 is first removed. The arms 712, together with the rest of the backrest, are pulled rearward. Then, while continuing to pull the arms 712 rearward, the backrest is pivoted up about the posts 736. The backrest can then be pushed forward to be removed. The rear seat portion 16 is then reinstalled on the vehicle 10.

Figure 17:
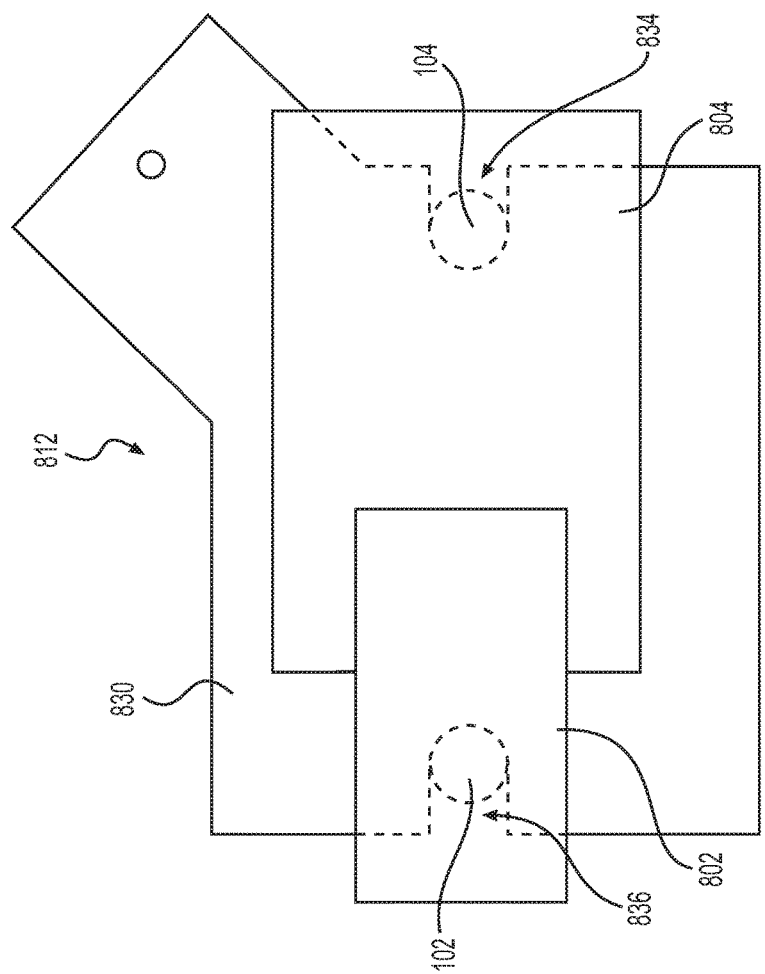
FIG. 17 is a left side elevation view of a schematic illustration of another alternative implementation of a right arm of the backrest of FIG. 4 and associated posts.

FIG. 17 illustrates an arm 812. The arm 812 only has a main portion 830 defining a slot 834 that opens rearward and a slot 836 that opens forward. The arm 812 does not have a sliding portion.

In this implementation, the posts 102, 104 are connected to and extend outwardly from front brackets 802 and rear brackets 804 respectively. Each front bracket 802 is slidable relative to its corresponding rear bracket 804, and a biasing member (not shown), such as a helical spring, biases the brackets 802, 804 toward each other. The brackets 804 are fixed to the frame 24. It is contemplated that the brackets 804 could be integrally formed with the frame 24. It is also contemplated that the brackets 804 could be omitted, in which case the posts 104 would be connected directly to the frame 24 and the biasing members would be connected between the brackets 802 and the frame 24 to bias the brackets 802 toward the posts 104. In an alternative implementation, it is contemplated that the brackets 802 could be fixed to the frame 24 and that the bracket 804 could slide relative to the brackets 802.

To install a backrest having the arms 812 on the vehicle 10, the rear seat portion 16 is first removed. The arms 812, together with the rest of the backrest, are moved forward at an angle to insert the posts 102 into the slots 836. Once the posts 102 abut the main portion 830, the arms 812 continue to be pushed forward such that the brackets 802, with the posts 102, move forward relative to the brackets 804. As result, the biasing members are extended between the brackets 802, 804 and the overall distance between the posts 102, 104 is increased. Then, while continuing to push the arms 812 forward, the backrest is pivoted down about the posts 102 in order to align the posts 104 with the slots 834 of the main portions 830. Then, the arms 812 are released. As a result, the biasing members bias the front brackets 802 and the main portions 830 rearward such that the posts 104 are inserted into the slots 834 of main portions 830. The rear seat portion 16 is finally installed on the frame 24 over the tray 110.

To remove the backrest having the arms 812 from the vehicle 10, the rear seat portion 16 is first removed. The arms 812, together with the rest of the backrest, are pushed forward. Then, while continuing to push the arms 812 forward, the backrest is pivoted up about the posts 102. The backrest can then be pulled rearward to be removed. The rear seat portion 16 is then reinstalled on the vehicle 10.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A vehicle comprising:
a frame;
a straddle seat mounted to the frame;
two first posts connected to the frame on opposite sides of a longitudinal centerline of the vehicle;
two second posts connected to the frame on opposite sides of the longitudinal centerline of the vehicle and being longitudinally spaced from the two first posts; and
a backrest selectively connected to the frame, the backrest comprising:
a back support;
a first arm connected to the back support, the first arm extending at least from the first post to the second post on a first side of the longitudinal centerline; and
a second arm connected to the back support, the second arm extending at least from the first post to the second post on a second side of the longitudinal centerline,
each of the first and second arms comprising:
a first portion, the first portion at least partially defining a first slot;
a second portion slidably connected to the first portion, the second portion defining a second slot, the first and second slots opening in opposite directions; and
a biasing member disposed between the first and second portions,
the first posts being received in the first slots and abutting the first portions,
the second posts being received in the second slots and abutting the second portions, and
the biasing members biasing the first portions toward the first posts and the second portions toward the second posts.

2. The vehicle of claim 1, wherein:
the first slot and the second slot of the first arm open away from each other;
the first slot and the second slot of the second arm open away from each other;
the biasing member of the first arm biases the first and second portions of the first arm away from each other; and
the biasing member of the second arm biases the first and second portions of the second arm away from each other.

3. The vehicle of claim 1, wherein:
the first slot and the second slot of the first arm open toward each other;
the first slot and the second slot of the second arm open toward each other;
the biasing member of the first arm biases the first and second portions of the first arm toward each other; and
the biasing member of the second arm biases the first and second portions of the second arm toward each other.

4. The vehicle of claim 1, wherein the backrest further comprises:
a first leg connecting the first arm to the back support; and
a second leg connecting the second arm to the back support.

5. The vehicle of claim 1, further comprising:
a first strap connected to the first arm;
a second strap connected to the second arm;
a first hook connected to the frame and engaging the first strap; and
a second hook connected to the frame and engaging the second strap.

6. The vehicle of claim 1, wherein the first posts are disposed forward of the second posts; and
wherein the back support is rigidly connected to the second portions.

7. The vehicle of claim 1, wherein for each of the first and second arms, the first and the second portions define a housing and the biasing member is housed in the housing.

8. A vehicle comprising:
a frame;
a straddle seat mounted to the frame;
two first elements on opposite sides of a longitudinal centerline of the vehicle;
two second elements on opposite sides of the longitudinal centerline of the vehicle and being longitudinally spaced from the two first elements; and
a backrest selectively connected to the frame, the backrest comprising:
a back support;
a first arm connected to the back support, the first arm extending at least from the first element to the second element on a first side of the longitudinal centerline; and
a second arm connected to the back support, the second arm extending at least from the first element to the second element on a second side of the longitudinal centerline,
each of the first and second arms comprising a third element and a fourth element longitudinally spaced from the third element; and
two biasing members biasing one of:
the first element relative to the second element; and
the third element relative to the fourth element;
the first element being one of a first post and a first slot;
the second element being one of a second post and a second slot;
the third element being another one of the first post and the first slot;
the fourth element being another one of the second post and the second slot;
the first posts being received in the first slots, the second posts being received in the second slots;

the biasing members biasing the first posts into the first slots and the second posts into the second slots.

9. A method for installing a backrest on a vehicle, the vehicle having:
- a frame;
- a straddle seat mounted to the frame;
- one of:
  - two first posts connected to the frame on opposite sides of a longitudinal centerline of the vehicle, and
  - two first brackets connected to the frame on opposite sides of the longitudinal centerline, each of the two first brackets defining a first slot; and
- one of:
  - two second posts connected to the frame on opposite sides of the longitudinal centerline, and
  - two second brackets connected to the frame on opposite sides of the longitudinal centerline, each of the two second brackets defining a second slot;

the backrest having:
- a back support;
- a first arm connected to the back support; and
- a second arm connected to the back support, each of the first and second arms having:
- a first portion, the first portion at least partially defining the first slot when the vehicle has the first post, the first portion having the first post connected thereto when the vehicle has the first bracket;
- a second portion slidably connected to the first portion, the second portion defining the second slot when the vehicle has the second post, the second portion having the second post connected thereto when the vehicle has the second bracket; and
- a biasing member biasing the first portion away from the second portion;

the method comprising:
- inserting the first posts in the first slots;
- pushing the first and second arms to compress the biasing members;
- once the biasing members are compressed:
  - aligning the second posts with the second slots; and
  - releasing the first and second arms such that the biasing members bias the second portions away from the first portions thereby inserting the second posts in the second slots.

10. The method of claim 9, wherein the first posts and the first slots are disposed forward of the second posts and the second slots.

* * * * *